United States Patent [19]

Koyama et al.

[11] Patent Number: 5,324,767
[45] Date of Patent: Jun. 28, 1994

[54] THERMOSETTING RESIN COMPOSITION FOR CASTING HIGH-VOLTAGE COIL, AND MOLDED COIL AND PANEL FORMED BY CASTING AND CURING THE COMPOSITION

[75] Inventors: Tohru Koyama; Hirokazu Takasaki; Hiroshi Suzuki, all of Hitachi; Shigeo Amagi, Ibaraki; Akio Mukoh, Mito; Ikushi Kano, Ibaraki, all of Japan

[73] Assignee: Hitachi, Ltd., Tokyo, Japan

[21] Appl. No.: 887,769

[22] Filed: May 22, 1992

[30] Foreign Application Priority Data

May 23, 1991 [JP] Japan ................................ 3-118349

[51] Int. Cl.$^5$ ............................................. C08K 3/34
[52] U.S. Cl. ................................... 524/493; 523/443; 523/444; 523/220
[58] Field of Search ................ 524/493; 523/443, 444, 523/220

[56] References Cited

U.S. PATENT DOCUMENTS

| | | | |
|---|---|---|---|
| 3,637,572 | 5/1970 | Ogata et al. | 523/220 |
| 4,293,479 | 10/1981 | Hanada et al. | 523/443 |
| 4,617,330 | 10/1986 | Thai et al. | 523/443 |
| 4,701,479 | 10/1987 | Shiobara et al. | 523/220 |
| 5,049,596 | 9/1991 | Fujimoto et al. | 523/443 |
| 5,137,940 | 8/1992 | Tomiyoshi et al. | 523/443 |
| 5,166,228 | 11/1992 | Shiobara et al. | 523/443 |

FOREIGN PATENT DOCUMENTS 60-10533 of 1985 Japan.
63-317545 of 1988 Japan.
64-763 of 1989 Japan.

Primary Examiner—Paul R. Michl
Assistant Examiner—Edward Cain
Attorney, Agent, or Firm—Antonelli, Terry, Stout & Kraus

[57] ABSTRACT

A thermoplastic resin composition for casting high-voltage coils containing two kinds of fillers (A) and (B), and products as molded coils and panels obtained by casting and curing the composition.

The composition of the present invention contains 60%–85% by weight, based on the total weight of the composition, of a silica type filler which is an admixture (A) a spherical silica having an average particle diameter of 0.1–0.9 $\mu$m and (B) a ground silica having an average particle diameter of 3–9 $\mu$, the ratio A/(A+B) being 1%–7% by weight.

Products as molded coils and panels prepared by using the composition have good resistance to cracking and resistance to moisture.

43 Claims, 14 Drawing Sheets

THERMOSETTING RESIN COMPOSITION FOR CASTING HIGH-VOLTAGE COIL, AND MOLDED COIL AND PANEL FORMED BY CASTING AND CURING THE COMPOSITION

BACKGROUND OF THE INVENTION

1. Field of the Invention

The present invention relates to a thermosetting resin composition for casting high-voltage coils having good moisture resistance, and to coils and panels formed by casting and curing the resin composition. In more particular, it relates to a thermosetting resin composition for casting high-voltage coils which has a low viscosity and good workability at the time of casting, little of voids and, after cured, develops no cracks when subjected to a heat cycle of from $-30°$ C. to $90°$ C. and does not decrease its strength and electrical performance characteristic to half even after the lapse of 15 years or more in high humidity atmosphere, and to molded coils and panels formed by casting and curing the resin composition.

2. Description of the Related Art

In recent years, many of the high-voltage coils have come to be operated in high humidity atmospheres such as those in tunnels and underground rooms. In the Yamanashi new test line for magnetic levitation system railway, for example, 80% or more of the ground coils are laid in tunnels of humidities of 90% or more and needed to secure the reliability in mechanical strength and electrical characteristics. The same applies also to transformers installed in tunnels for tunnelling work.

In keeping with the above trend, the insulation technology for such high-voltage coils is making marked progress. In particular, the solventless thermosetting resin casting method has rapidly developed, by virtue of its high electrical reliability, good heat dissipation and excellent moisture resistance, in the field of the manufacture of high-voltage coils used in severe conditions, such as those for direct current motors for vehicles, direct current motors for general industries, transformers, ground coils for magnetic levitation system railways, etc.

Requisites for the aforementioned solventless thermosetting resin composition are as follows. (1) It should have a low viscosity so as to permit easy coil casting. In more particular, it should have a viscosity of 50 poises or less at the casting temperature in the case of vacuum or atmospheric pressure casting and a viscosity of 300 poises or less at the casting temperature in the case of pressure gelation casting. (2) It should have a long pot life. (3) It should no evolve volatile matters so that no void is developed in the course of heat curing. (4) It should exhibit goo electrical and mechanical properties when cured. Solventless thermosetting resin compositions for casting which were in general use as satisfying the above requisites are carboxylic acid anhydride-curing epoxy resin compositions having a low viscosity and filled with fused or crystalline silica having good electrical properties.

High-voltage coils operated in tunnels, underground rooms, etc. are exposed to high humidity atmosphere of 90% or more humidity over a long period while being subjected to a heavy mechanical or electric load. The cured product of the prior carboxylic acid anhydride-curing epoxy resin composition filled with fused or crystalline silica undergoes rapid deterioration of mechanical and electrical properties when it is in a state wetted by absorption of moisture or water. When a heavy load is mechanically or electrically applied in such a state, the system fails.

Molded coils formed by winding a conductor and casting and curing a thermosetting resin composition for casting high-voltage coils are apt to develop cracks in the insulating layer during the manufacture of the coils or when the coils are subjected to a heat cycle unless the thermal expansion coefficient of the cured product of the resin composition is adjusted to (the thermal expansion coefficient of the conductor $\pm 0.2) \times 10^{-5}$ deg$^{-1}$, as described in Japanese Patent Kokai (Laid Open) Nos. 62-224009 and 2-32508. Therefore, it is necessary for avoiding the development of the cracks to match the thermal expansion coefficient of the insulating layer with that of the conductor, which has a low thermal expansion coefficient. It was found that when the proportion of the filler in the carboxylic acid anhydride-curing epoxy resin composition filled with fused or crystalline silica mentioned above was increased in order to lower the thermal expansion coefficient of the insulating layer, the cured product of the resin composition decreased its strength to half in from 1 to 3 years when exposed to high humidity atmosphere while being subjected to a heavy mechanical or electrical load. Therefore, the development of a resin composition for casting high-voltage coils with high moisture resistance has been eagerly desired.

Careful investigations of the cause of the aforementioned poor moisture resistance of the cured product of the carboxylic acid anhydride-curing epoxy resin composition filled with fused or crystalline silica have revealed the following.

(1) Penetration of water occurs mainly from the interface between the filler and the cured resin. Since a large amount of filler is contained, there is a high possibility of the filler particles striking one another, and the paths of water penetration tend to be readily connected.

(2) Since a large amount of filler is contained, the viscosity of the resin composition at the time of casting operation becomes high, which tends to develop voids. Water tends to stay in the voids and cause the deterioration of the resin composition.

If the proportion of the filler added is reduced, the viscosity at the time of casting is lowered to reduce the void formation and, at the same time, the possibility of the filler particles striking one another becomes low. Thus, the improvement of the moisture resistance is possible. In this case, however, another problem arises in that since the thermal expansion coefficient of the insulating layer becomes high, cracks will develop in the insulating layer at the time of coil manufacture or when the coil is subjected to a heat cycle of from $-30°$ C. to $90°$ C. At the same time, since the heat conductivity becomes low, the heat distribution in the layer becomes not uniform, which tends to develop thermal stress. Further, the heat generated during electricity application can be dissipated with more difficulty and stays inside the layer to raise the temperature, causing the deterioration of the resin composition.

Further, even if a coil which can endure a heat cycle of from $-30°$ C. to $90°$ C. can be successfully manufactured, the following problem must be solved. In the case of a driving coil for a linear motor car, for example, previously the whole of the coil manufactured was firmly fixed with bolts, spacers and the like or embedded directly into concrete to oppose the electromagnetic force. In such cases, cracks were apt to develop in the coil or concrete owing to the thermal stress caused at the time of heat cycle of −30° C. to 90° C. Further, the fixed parts tended to loosen or undergo creep fracture. Thus, the system was lacking in reliability.

In view of the aforementioned situations, the object of the present invention is to provide a thermosetting resin composition for casting high-voltage coils of good moisture resistance which has a low viscosity and good workability at the time of casting operation and, after curing, gives little of voids in the cured product, develops no cracks even when subjected to a heat cycle of from −30° C. to 90° C. and does not decrease its strength and electric performance characteristic to half even after exposed to high humidity atmosphere of 90% or more humidity over 15 years or more while being subjected to a heavy mechanical or electrical load, and also molded coils and panels formed by casting and curing the resin composition.

SUMMARY OF THE INVENTION

When no filler is added to the thermosetting resin composition, the shrinkage in curing is high, the heat dissipation is poor, and further the thermal expansion coefficient of the cured resin is higher than that of the coil conductor. Consequently, a large thermal stress is developed at the time of coil manufacture and in the heat cycle, resulting in development of cracks in the cured product of the resin composition and ultimately in the electric breakdown of the coil.

The addition of a filler affords the following advantages.
(1) The shrinkage in curing is reduced, resulting in a low stress developed in curing.
(2) The thermal expansion coefficient becomes lower and approaches to that of the coil conductor, so that a lower thermal stress is developed.
(3) The heat conductivity is increased and resultantly the heat dissipation is improved and the temperature distribution becomes more uniform. Consequently, the thermal stress is reduced and the temperature rise is reduced.
(4) Since the filler is less expensive than resin itself, the cost can be reduced. Thus, the addition of a filler lowers the cost, reduces the thermal stress developed at the time of coil manufacture and in the heat cycle, and enhances the reliability of the coil. Therefore, the addition of a filler is indispensable. It is needless to say that the filler itself must have a good moisture resistance.

On the other hand, the addition of a filler gives rise to the following disadvantages.
(1) The viscosity is increased to make casting more difficult.
(2) Development of cracks and permeation of water becomes more apt to occur from the interface of the filler and the resin.
(3) The cured resin becomes more rigid and brittle.
(4) Since the filler is heavier than the base resin, sedimentation of the filler takes place during curing, resulting in nonuniformity of the insulating layer. Therefore, fillers must be used in due consideration of these factors.

Among such fillers, are crystalline silica, fused silica and Alumina. Crystalline silica has a higher heat conductance and better resistance to concrete than fused silica, but has the defect of a lower linear expansion coefficient.

In order to prevent the development of cracks in the insulating layer at the time of coil manufacture or in a heat cycle of from −30° C. to 90° C, it is necessary to adjust the thermal expansion coefficient of the insulating layer, i.e. the cured product of the resin composition, to within ±20%, particularly within ±10%, of the thermal expansion coefficient of the coil conductor. When the thermal expansion coefficient of the cured product of the resin composition is made to match with that of the coil conductor by filling fused silica, the heat dissipation is poor since the heat conductivity is low. In contrast, when crystalline silica, which is more inexpensive, is used, it gives a high heat conductivity; however, since the silica has a higher thermal expansion coefficient, a larger amount of the silica must be filled than in using fused silica to match the thermal expansion coefficient of the cured product of the resin composition with that of the coil conductor. The key point in using crystalline silica is how to attain high density filling while keeping a low viscosity.

An equation shown below holds in general between the thermal expansion coefficient, $\alpha$, of the cured product of the resin composition and the amount of the filler added, V (volume content). Therefore, the amount of the filler to be added can be determined by calculation.

$$\alpha = \alpha_1 - \frac{3(1 - v_1)(\alpha_2 - \alpha_1)}{(1 - 2v_1)\gamma V + (1 + v_2) + 2(1 - 2v_1)(1 - \gamma V) \times (E_2/R_1)} \quad \text{(Equation 1)}$$

wherein
$\alpha_1$: thermal expansion coefficient of filler
$\alpha_2$: thermal expansion coefficient of matrix resin
$v_1$: Poisson's ratio of filler
$v_2$: Poisson's ratio of matrix resin
$\gamma$: correction factor for geometry
$E_1$: modulus of elasticity of filler
$E_2$: modulus of elasticity of matrix resin.

When the vacuum or atmospheric pressure casting method is used, the viscosity of the resin composition generally needs to be maintained within 10-50 poises at the casting temperature. When the pressure gelation method is used, the viscosity of the resin composition generally needs to be kept at several hundred poises at the casting temperature. When the viscosity is too high the fluidity becomes insufficient and consequently voids or such leave behind and the dielectric property is deteriorated. Thus, a defective casting results. When the viscosity is too low, on the other hand, the sedimentation of the filler takes place, leading to nonuniformity in the property of the insulating layer. When the distribution of the filler in the insulating layer becomes uneven, the percentages of curing shrinkage and the heat shrinkage in the cured product will differ depending on the site in the layer and, particularly at the uppermost part of the casting, where the content of the filler is low, the residual strain becomes the highest, so that cracks tend to develop from the upper part. This is also a serious problem.

On the other hand, the viscosity of the resin composition is affected, besides by the amount of the filler added, also by the particle size distribution of the filler and the kind and the amount of the surface active agent added, to a large extent. As to the particle size distribution of the filler, it was commonly believed at first that the addition of fillers of small particle diameters generally increases the viscosity, and fillers of relatively large particle diameters were in use. Owing to the large particle diameter, such fillers tend more strongly to sediment. Consequently, a method was in use wherein a slight amount of a filler of small particle diameter was added at the sacrifice of workability to attain a high viscosity and further the curing time was shortened. This method, however, has the problems of stronger tendency to leave voids behind owing to the high viscosity and of higher residual strain owing to fast curing.

Thereafter, it was found that, as described in Japanese Patent Kokoku (Post-Exam. Publn.) Nos. 60-10533 and 64-763, when filler particles having a particle diameter of 80 μm or more are cut off and two or more fillers different in particle distribution are mixed appropriately so as to decrease the value n in the Rosin-Rammler equation shown below to as low a value as possible of 0.9 or less and widen the particle distribution, a low viscosity can be attained without causing sedimentation.

$$R(Dp) = 100 \exp(-bDp^n) \qquad \text{(Equation 2)}$$

wherein
R(Dp): cumulative percentage by weight from the maximum particle diameter to particle diameter Dp,
Dp: particle diameter,
b and n: constants.

The reason why particles having a diameter of 80 μm or more are cut off is that the presence of particles having a diameter of 80 μm or more causes sedimentation and resultantly tends to develop cracks.

On the other hand, it was found recently that, as described in Japanese Patent Kokai (Laid Open) No. 63-317545, by adding a filler having a large average particle diameter and a filler having a small one in combination to the curing agent component of a two component epoxy resin composition, the fluidity of the resin composition can be improved.

On the basis of the above knowledge, the present inventors obtained a thermosetting resin composition by properly mixing (A) a fine particle crystalline silica having an average particle diameter of 0.8 μm with (B) a coarse particle crystalline silica having particle diameters of 80 μm or less to give the value n in the Rosin-Rammler equation of 0.7 and regulating the amount of the silica type filler added so as to adjust the thermal expansion coefficient of the cured product of the thermosetting resin composition to [the thermal expansion coefficient of the conductor (in the case of Al, for example, 2.3) ±0.2]×10⁻⁵ deg⁻¹. It was found that the thermosetting resin composition showed a rapid increase in apparent viscosity, that is, an increase in dilatancy, when the value n was decreased and particularly with increase in the rate of shear. When the cured product of the thermosetting resin composition was prepared and its moisture resistance and water resistance were examined, the cured product was found to have a problem in that it decreased the strength rapidly in the wet state.

The present inventors have then made extensive study to solve the problem. As a result it has been found that when (A) a spherical particle having an average particle diameter of 0.1–0.9 μm is added to (B) a coarse particle having particle diameters of 80 μm or less, the apparent viscosity increases with the increase of the amount of (A) added at a low rate of shear as usually measured with a Brookfield type viscometer, as has been believed hitherto, but the apparent viscosity conversely decreases at a high rate of shear as experienced when the resin flows through piping at the time of casting; that is, the dilatancy of the composition decreases with the increase of the amount of (A) added. (A) is in the service of a roller. It has been found, from the viewpoint of casting workability, that when fillers different in particle distribution are properly mixed to widen the particle distribution and additionally in such a way that (A) a spherical particle filler having an average particle diameter of 0.1–0.9 μm is mixed with (B) a coarse particle filler having particle diameters of 80 μm or less so as to give a ratio of A/(A+B) of 1%–7% by weight, the viscosity at the time of casting operation can be lowered without causing sedimentation, resulting in less development of voids, and the resin composition can be cast at previous mild curing conditions. Further, upon preparation of the cured product of the thermosetting resin composition and examination of its moisture resistance and water resistance, it has been found that these properties are greatly improved as compared with those obtained by the addition of fine angular powder filler. The present invention has been accomplished on the basis of above bindings.

When the average particle diameter of the spherical particle filler is too small, the influence of the van der Waals force acting between fine particles tends to be too large and the viscosity tends to increase on the contrary. On the other hand, when the average particle diameter is too large, the effect of the addition of spherical filler tends to decrease. The SEM observation of the cured product shows that the spherical particles of filler having an average particle diameter of 0.1–0.9 μm have been adsorbed onto the surface of coarse particle filler.

As described above, the addition of filler increases the viscosity to make casting operation more difficult. Therefore, a higher casting temperature must be used than in unfilled resin and, when the vacuum or atmospheric pressure casting method is used, the casting must be conducted while keeping the viscosity at 50 poises or below. In order to keep the viscosity of 50 poises or below during the casting operation, the selection of curing catalysts is important which are relatively stable at low temperature and rapidly advance the reaction at high temperature, that is, exhibit so-called latent catalytic property. Further, the use of a surface active agent is indispensable in order to improve the affinity between the filler and the resin composition and to avoid the development of cracks and the permeation of water from the interface between the filler and the resin. As to the surface active agent, it is effective from the viewpoint of high thermal resistance to use a multifunctional surface active agent and, from the viewpoints of cracking resistance and lower viscosity, to use a monofunctional surface active agent. The use of a multifunctional surface active agent and a monofunctional one in combination is particularly important from the viewpoints of moisture resistance and cracking resistance.

Further, even if a coil which can endure a heat cycle of from −30° C. to 90° C. can be successfully manufactured, the following problem must be solved. In the case of a driving coil for a linear motor car, for example, previously the whole of the coil manufactured was firmly fixed with bolts, spacers and the like or embedded directly into concrete to oppose the electromagnetic force. In such cases, cracks were apt to develop in the coil or concrete owing to the thermal stress caused at the time of heat cycle of from −30° C. to 90° C. Further, the fixed parts tended to loosen or undergo creep fracture. Thus, the system was lacking in reliability.

The present inventors have made various studies to solve the problems. As the result it has been found that, as to the method of attaching a driving coil of a linear motor car or the like to a concrete panel, it is necessary to take into consideration that (1) the electromagnetic force be sustained by plane to avoid local concentration of stress and (2) the attachment be rendered free of thermal elongation to prevent cracks developed by thermal stress in a heat cycle. The aforementioned requisite (1) is for avoiding the local concentration of electromagnetic force. Particularly, when the coil has been fixed with bolts, loosening of the bolt due to creep etc. can occur and cause a problem. The aforementioned requisite (2) comes from the following problem. Suppose that the coil b fixed entirely to concrete. Since the coil has a high thermal expansion coefficient of about $2.3 \times 10^{-5}$ deg$^{-1}$ as compared with the thermal expansion coefficient of concrete of about $1 \times 10^{-5}$ deg$^{-1}$, when a heat cycle of from −30° C. to 90° C. is applied, for example, a thermal stress ($\geqq 257$ kg·cm$^{-2}$) which can be calculated by the equation $$\int_{-30}^{90} E(\alpha_{conductor} - \alpha_{concrete})dt \qquad \text{(Equation (3))}$$

develops and causes cracking in the cured product of resin composition or, as the stress exceeds the flexural strength and the tensile strength, 30-60 kg·cm$^{-2}$, of concrete, causes cracking in the concrete.

The present invention will be outlined below.

The first aspect of the present invention relates to a thermosetting resin composition for casting high-voltage coils having good moisture resistance and also coils and panels formed by casting and curing the resin composition, and in more particular to a thermosetting resin composition for casting high-voltage coils which has a low viscosity and good workability at the time of casting, forms little of voids and, after cured, develops no cracks when subjected to a heat cycle of from −30° C. to 90° C. and does not decrease its strength and electric performance characteristic to half even after the lapse of 15 years or more in high humidity atmosphere and, wherein the filler contains 60%-85% by weight, based on the total weight of the composition, of a silica type filler consisting essentially of (A) a spherical silica having an average particle diameter of 0.1-0.9 μm and (B) a silica having an average particle diameter of 3-24 μm (provided that the maximum particle diameter is 80 μm or less), the ratio of A/(A+B) being 1%-7% by weight.

The thermosetting resin composition for casting high-voltage coils preferably contains, from the viewpoints of enhancing thermal resistance and workability, at least a multifunctional epoxy resin, an acid anhydride curing agent, a filler, a surface active agent and a curing catalyst. The silica of (B) is preferably a crystalline silica whose average particle diameter has been adjusted to 3-9 μm by regulating the grinding time from the viewpoint of cost. As the surface active agent, are preferably used a multifunctional surface active agent and a monofunctional one in combination.

The second aspect of the present invention relates to a coil which is formed by winding a conductor and casting and curing a thermosetting resin composition for high-voltage coils having good moisture resistance and cracking resistance, wherein the filler contains 60%-85% by weight, based on the total weight of the composition, of a silica type filler consisting essentially of (A) a spherical silica having an average particle diameter of 0.1-0.9 μm and (B) a silica having an average particle diameter of 3-24 μm (provided that the maximum particle diameter is 60 μm or less), the ratio of A/(A+B) being 1%-7% by weight.

The third aspect of the present invention relates to a panel formed by fixing a molded coil obtained by winding a conductor and casting and curing a thermosetting resin composition for casting high-voltage coils to concrete or resin concrete with bolts, spacers and the like, wherein the resin composition is a thermosetting resin composition for casting high-voltage coils having good moisture resistance and cracking resistance wherein the filler contains 60%-85% by weight, based on the total weight of the composition, of a silica type filler consisting essentially of (A) a spherical silica having an average particle diameter of 0.1-0.9 μm and (B) a silica having an average particle diameter of 3-24 μm (provided that the maximum particle diameter is 60 μm or less), the ratio of A/(A+B) being 1%-7% by weight The fourth aspect of the present invention relates to a panel formed by fixing a molded coil obtained by winding a conductor and casting and curing a thermosetting resin composition for casting high-voltage coils to concrete or resin concrete, wherein a part of the coil is rendered free of thermal elongation.

The thermosetting resin composition for casting high-voltage coils of the present invention can be used not only for ground coils, molded transformers, flyback transformers, and fluorescent lamp transformers, but also for motors for washing machines, starter motors for automobiles, adhesives for electric and electronic parts such as bushing, TAB, COB, etc., general purpose adhesives, and composite materials such as FRP, laminate sheets, etc.

When using phenolic curing agents, the thermosetting resin composition can be used for semi conductor.

Examples of the thermosetting resin composition for casting high-voltage coils include unsaturated polyester-based resin compositions, polyurethane-based resin compositions, silicone-based resin compositions, acid anhydride-curing epoxy resin compositions, amine-curing epoxy resin compositions, thiol-curing epoxy resin compositions, phenol-curing epoxy resin, phenol novolaks-curing epoxy resin, cresol novolaks-curing epoxy resin, catalyst alone-curing epoxy resin compositions, isocyanate-curing epoxy resin compositions, maleimide-based resin compositions, etc. Preferred among them from the viewpoints of electric property and thermal resistance are acid anhydride-curing epoxy resin compositions, maleimide-based resin compositions and isocyanate-curing epoxy resin compositions. From the viewpoint of ease of handling, acid anhydride-curing epoxy resin compositions containing a multifunctional epoxy resin, an acid anhydride curing agent, a filler, a surface active agent, and a curing catalyst are particularly preferred.

The multifunctional epoxy resin used in the present invention is not particularly limited so long as it is a multifunctional epoxy resin having two or more epoxy groups. Examples of such epoxy resins include bifunctional epoxy resins such as diglycidyl ether of bisphenol A, diglycidyl ether of bisphenol F, diglycidyl ether of bisphenol AF, diglycidyl ether of bisphenol AD, diglycidyl ether of hydrogenated bisphenol A, diglycidyl ether of 2,2-(4-hydroxyphenyl)nonadecane, 4,4'-bis(2,3-epoxypropyl) diphenyl ether, 3,4-epoxycyclohexylmethyl-(3,4-epoxy)cyclohexanecarboxylate, 4-(1,2-epoxypropyl)-1,2-epoxycyclohexane, 2-(3,4-epoxy)cyclohexyl-5,5-spiro-(3,4-epoxy)-cyclohexane-m-dioxane, 3,4-epoxy-6-methylcyclohexylmethyl-4-epoxy-6-methylcyclohexanecarboxylate, butadiene-modified epoxy resin, urethanemodified epoxy resin, thiol-modified epoxy resin, diglycidyl ether of diethylene glycol, diglycidyl ether of triethylene glycol, diglycidyl ether of polyethylene glycol, diglycidyl ether of polypropylene glycol, diglycidyl ether of 1,4-butanediol, diglycidyl ether of neopentyl glycol, diglycidyl ether of the adduct of bisphenol A and propylene oxide, and diglycidyl ether of the adduct of bisphenol A and ethylene oxide; and trifunctional epoxy resins such as tris[p-(2,3-epoxypropoxy)phenyl]methane and 1,1,3-tris[p-(2,3-epoxypropoxy)phenyl]butane. Further, mention may be made of multifunctional epoxy resins including glycidylamines such as tetraglycidyldiaminodiphenylmethane, triglycidyl-p-aminophenol, triglycidyl-m-aminophenol, diglycidylamine, tetraglycidyl-m-xylenediamine and tetraglycidylbisaminomethylcyclohexane, phenol novolak type epoxy resin and cresol novolak type epoxy resin. Multifunctional epoxy resins obtained by reacting epichlorohydrin with a mixture of at least two polyhydric phenols selected from (a) bis(4-hydroxyphenyl)methane, (b) bis(4-hydroxyphenyl)ethane, (c) bis(4-hydroxyphenyl)propane, (d) tris(4-hydroxyphenyl)alkane, and (e) tetrakis(4-hydroxyphenyl)alkane can also be used because they have a low viscosity and good workability before being cured and exhibit a high thermal resistance after being cured. Examples of the tris(4-hydroxyphenyl)alkane include tris(4-hydroxyphenyl)methane, tris(4-hydroxyphenyl)ethane, tris(4-hydroxyphenyl)propane, tris(4-hydroxyphenyl)butane, tris(4-hydroxyphenyl)hexane, tris(4-hydroxyphenyl)heptane, tris(4-hydroxyphenyl)octane and tris(4-hydroxyphenyl)nonane. Tris(4-hydroxyphenyl)alkane derivatives such as tris(4-hydroxydimethylphenyl)methane, etc. may also be used. Examples of the tetrakis(4-hydroxyphenyl)alkane include tetrakis(4-hydroxyphenyl)methane, tetrakis(4-hydroxyphenyl)ethane, tetrakis(4-hydroxyphenyl)propane, tetrakis(4-hydroxyphenyl)butane, tetrakis(4-hydroxyphenyl)hexane, tetrakis(4-hydroxyphenyl)heptane, tetrakis(4-hydroxyphenyl)octane, and tetrakis(4-hydroxyphenyl)nonane. Tetrakis(4-hydroxyphenyl)alkane derivatives such as tetrakis(4-hydroxymethylphenyl)methane, etc. may also be used. Useful among them from the viewpoint of viscosity are diglycidyl ether of bisphenol A, diglycidyl ether of bisphenol F, diglycidyl ether of bisphenol AF, diglycidyl ether of bisphenol AD, tetraglycidyldiaminodiphenylmethane, triglycidyl-p-aminophenol, triglycidyl-m-aminophenol, diglycidylamine, tetraglycidyl-m-xylenediamine and tetraglycidyl-bisaminomethylcyclohexane. In particular, diglycidyl ether of bisphenol F and diglycidyl ether of bisphenol AF are useful from the viewpoints of viscosity and resistance to cracking. The multifunctional epoxy resins may also be used in combination of two or more thereof. Further, as occasion demands, monofunctional epoxy resins such as butyl glycidyl ether, styrene oxide, phenyl glycidyl ether, and alkyl glycidyl ether may be added to the multifunctional epoxy resins to lower the viscosity of the resin. However, the amount of a monofunctional epoxy resin added must be limited to a small value because though it has the effect of lowering the viscosity it tends to lower the thermal resistance.

The acid anhydride curing agent used in the present invention is not particularly limited so long as it is an ordinary acid anhydride. Examples of such compounds include methylhexahydrophthalic anhydride, hexahydrophthalic anhydride, methyltetrahydrophthalic anhydride, tetrahydrophthalic anhydride, nadic anhydride, methylnadic anhydride, dodecylsuccinic anhydride, succinic anhydride, octadecylsuccinic anhydride, maleic anhydride, benzophenonetetracarboxylic acid anhydride, ethylene glycol bis(anhydrotrimellitate), glycerol tris(anhydrotrimellitate), and the like. These anhydrides may be used each alone or in a combination of two or more thereof. Particularly preferred among them from the viewpoints of viscosity and resistance to cracking are methylhexahydrophthalic anhydride and hexahydrophthalic anhydride.

The maleimide-based resin compositions used in the present invention are not specifically limited so long as they are resin compositions containing maleimide. Examples of such maleimide-based resin compositions include those described in Japanese Patent Kokai (Laid Open) No. 60-184509 and Japanese Patent Kokoku (Post-Exam. Publication) Nos. 58-17532, 57-28416, 57-37604, 56-50900, 55-39242, 51-29760, 51-35520, 50-9840, 49-290080, and 49-1960. Preferred among them from the viewpoints of viscosity and thermal resistance are bismaleimide- and/or monomaleimide-containing acid anhydride-curing epoxy resin composition and allylphenol-curing maleimide-based resin composition.

The thermosetting resin composition of the present invention may be incorporated with a flexibilizing agent to improve the resistance to cracking. The flexibilizing agent is not specifically limited so long as it is a flexibility imparting agent capable of imparting flexibility, toughness and adhesiveness. Examples of such a flexibilizing agent include diglycidyl ether of linoleic acid dimer, diglycidyl ether of polyethylene glycol, diglycidyl ether of polypropylene glycol, diglycidyl ether of alkylene oxide adduct of bisphenol A, urethane-modified epoxy resin, polybutadiene-modified epoxy resin, polyols such as polyethylene glycol, polypropylene glycol, and hydroxyl-terminated polyester, polybutadiene, alkylene oxide adduct of bisphenol A, polythiol, urethane prepolymer, polycarboxyl compounds, phenoxy resin, polycaprolactone, etc. Further, those compounds as caprolactone which are themselves of a low viscosity but turn into a polymer by polymerization during the cure of the impregnating resin and exhibit flexibility may be added as a flexibilizing agent. Preferred among them from the viewpoints of high toughness and low thermal expansion are polyol, phenoxy resin and polycaprolactone. The amount of the flexibilizing agent added should be limited to the necessary minimum because the addition of the agent tends to lower the thermal resistance. If possible it is better not to add a flexibilizing agent.

The curing catalyst used in the present invention is not specifically limited so long as it has the function of promoting the reaction of polyfunctional epoxy resin. Examples of such compounds include tertiary amines such as trimethylamine, triethylamine, tetramethylbutanediamine and triethylenediamine; amines such as dimethylaminoethanol, dimethylaminopentanol, tris(dimethylaminomethyl)phenol, and N-methylmorpholine; quaternary ammonium salts such as cetyltrimethylammonium bromide, cetyltrimethylammonium chloride, cetyltrimethylammonium iodide, dodecyltrimethylammonium bromide, dodecyltrimethylammonium chloride, dodecyltrimethylammonium iodide, benzyldimethyltetradecylammonium chloride, benzyldimethyltetradecylammonium bromide, allyldodecyltrimethylammonium bromide, benzyldimethylstearylammonium bromide, stearyltrimethylammonium chloride, and benzyldimethyltetradecylammonium acetylate; imidazoles such as 2-methylimidazole, 2-ethylimidazole, 2-undecylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-phenylimidazole, 1-cyanoethyl-2-methylimidazole, 1-cyanoethyl-2-undecylimidazole, 1-azine-2-methylimidazole, and 1-azine-2-undecylimidazole; microencapsulated amines and imidazoles; metal salts of amines and imidazoles with zinc octanoate and cobalt octanoate; 1,8-diazabicyclo(5,4,0)-undecene-7,N-methylpiperazine, tetramethylbutylquanidine; amine tetraphenylborates such as triethylammonium tetraphenylborate, 2-ethyl-4-methylimidazole tetraphenylborate, and 1,8-diazabicyclo(5,4,0)-undecene-7-tetraphenylborate; triphenylphosphine, triphenylphosphonium tetraphenylborate, aluminumtrialkyl acetoacetate, aluminum trisacetylacetoacetate, aluminum alcoholates, aluminum acylates, sodium alcoholates, boron trifluoride, complexes of boron trifluoride with amines or imidazoles, diphenyliodonium salt of $HAsF_6$, aliphatic sulfonium salts; amine imides obtained by reacting a monocarboxylic acid alkyl ester with hydrazines an monoepoxy compounds; and metallic soaps such as salts of cobalt, manganese, iron, etc. of octylic acid and naphthenic acid. Particularly useful among them are quaternary ammonium salts, metal salts of amines and imidazoles with octoates of zinc, cobalt, etc., amine tetraphenylborates, complexes of boron trifluoride with amines or imidazoles, diphenyliodonium salt of $HAsF_6$, aliphatic sulfonium salts, amine imide, and micapsules of amines or imidazoles, because they are latent curing catalysts, which are relatively stable at ordinary temperature but readily start the reaction when brought to high temperature, that is, have a latent catalytic property. These curing catalysts are generally added in a proportion of 0.1%–10% by weight relative to the multifunctional epoxy resin.

The filler used in the present invention is preferably crystalline silica from the viewpoints of high moisture resistance, high heat conductivity and low cost. From the viewpoint of lowering cost, the average particle diameter of the silica is preferably adjusted to 3–9 $\mu$m by prope regulation of grinding conditions. Further, fillers obtained under different grinding conditions, that is, fillers different in particle size distribution, may be mixed in an appropriate ratio to widen the particle size distribution. Other fillers may also be mixed with crystalline silica, which include fused silica, silica glass, alumina, hydrated alumina, hydrated magnesia, calcium carbonate, zirconium silicate, calcium silicate, talc, clay, mica, wollastonite, microdol, perlite, bentonite, aluminum silicate, silicon carbide whiskers, potassium titanate whiskers, heavy calcium carbonate, and glass fiber powders. Further, a powdery filler and a fibrous one may be blended to obtain increased strength. The filler is preferably added in such an amount that the thermal expansion coefficient of the cured product of the resulting thermosetting resin composition may fall within ±20%, particularly ±10%, of the thermal expansion coefficient of the coil conductor. In general, the amount of the filler added is preferably 60%–85% by weight, more preferably 55%–70% by weight, of the whole composition to attain the object of the present invention.

The resin composition containing the filler needs to be cast at a higher temperature as compared with a resin composition containing no filler. However, when casting is conducted at high temperature, curing of the resin can proceed during casting operation to cause rapid increase of viscosity. Therefore, the use of a so-called latent curing catalyst is preferable, which is relatively stable at the time of casting operation but rapidly advances reaction when the temperature is further increased. Further, the addition of a surface active agent, which enhances wetting between the epoxy resin and the filler, is necessary to avoid the development of cracks and the permeation of water from the interface of the filler and the resin after curing. The viscosity is greatly affected also by surface active agents.

The surface active agent used in the present invention is not specifically limited so long as it can enhance wetting between the thermosetting resin composition and the filler and can thus decrease the viscosity and improve resistance to cracking and resistance to moisture. Examples of such surface active agents include silane type surface active agents such as $\gamma$-chloropropyltrimethoxysilane, vinyltrichlorosilane, vinyltriethoxysilane, vinyltrimethoxysilane, vinyltris($\beta$-methoxyethoxy)silane, $\gamma$-methacryloxypropyltrimethoxysilane, $\beta$-(3,4-epoxycyclohexyl)ethyltrimethoxysilane, $\gamma$-glycidoxypropyltrimethoxysilane, $\gamma$-mercaptopropyltrimethoxysilane, $\gamma$-aminopropyltrimethoxysilane, and $\gamma$-ureidopropyltriethoxysilane; titanate type surface active agents such as isopropyl isostearoyl titanate, isopropyl trioctanonyl titanate, isopropyl methacryloyl isostearoyl titanate, isopropyl tridodecyl titanate, isopropyl isostearoyl diacryl titanate, isopropyl tris(dioctyl phosphate) titanate, isopropyl tricumylphenyl titanate, isopropyl tris(dioctyl pyrophosphate) titanate, isopropyl tris(n-amino-ethylaminoethyl)titanate, tetraisopropylbis(dioctylphosphite) titanate, tetraoctylbis(didodecyl phosphite) titanate, tetra(2,2-diallyloxymethyl-1-butyl)-bis(ditridecyl) phosphite titanate, diisostearoyl ethylene titanate, and bis(dioctyl pyrophosphate) ethylene titanate; aluminum-based surface active agents such as ethylacetoacetatealuminum düsopropylate and aluminum tris(ethylacetoacetate); zirconium-based surface active agents, etc. Preferred among them are $\gamma$-glycidoxypropyltrimethoxysilane, $\beta$-(3,4-epoxycyclohexyl)ethyltrimethoxysilane, $\gamma$-mercaptopropyltrimethoxysilane, $\gamma$-aminopropyltriethoxysilane, N-$\beta$-(aminoethyl)-$\gamma$-aminopropyltrimethoxysilane, isopropyl isostearoyl titanate, isopropyl trioctanoyl titanate, ethylacetoacetatealuminum diisopropylate, and aluminum tris(ethylacetoacetate). These surface active agents may also be used as a mixture of two or more thereof. Particularly preferred is to use together both (A) a monofunctional surface active agent such as isopropyl isostearoyl titanate, isopropyl trioctanolyl titanate and the like to attain low viscosity and improve resistance to cracking and (B) a multifunctional surface active agent such as $\gamma$-glycidoxypropyltrimethoxysilane, $\beta$-(3,4-epoxycyclohexyl)ethyltrimethoxysilane, $\gamma$-mercaptopropyltrimethoxysilane, $\gamma$-aminopropyltriethoxysilane, N-$\beta$-(aminoethyl)-$\gamma$-aminopropyltrimethoxysilane, and the like to improve moisture resistance and mechanical strength. The surface active agent may be either added after being applied to the filler in advance or later added to the resin composition already containing the filler, or may alternately added by using the above two methods together. From the viewpoint of enhancing wetting between the thermosetting resin composition and the filler, it is preferable either to treat the filler with the surface active agent in advance to compounding of the resin composition or to treat a portion of the filler with the surface active agent beforehand and later add the treated filler to the resin composition already containing the other portion of the filler. From the viewpoints of cost and ease of operation, however, the so-called integral method is preferable, in which the filler is later added to the resin composition. The preferred amount of the surface active agent to be added can be calculated by the equation specific surface area (m²/gr) of filler × weight (gr) of filler/covering area (m²/gr) of surface active agent.

The thermosetting resin composition for insulating high-voltage coils of the present invention may be incorporated with ultraviolet absorbers or the like to improve the weather resistance. Such weather resistance imparting agents are necessary particularly when the composition is directly exposed to sunlight, as in levitation coils for linear motor cars. Further, the thermosetting resin composition for insulating highvoltage coils of the present invention may contain pigments and colorants.

The property of the thermosetting resin composition for insulating high-voltage coils of the present invention is greatly affected by mixing conditions. That is, unless good wetting is attained between the resin and the filler by thorough mixing, the performance characteristic of the resin composition tends to be poor. On the other hand, if mixing is conducted for a long time, the viscosity will increase. Therefore, it is important that the necessary ingredients are added in several portions and mixed, rather than added and mixed all at once.

The portionwise addition mentioned above is preferably conducted in the following manner.

(1) (A) A resin composition obtained by mixing beforehand a polyfunctional epoxy resin, a surface active agent and a filler and (B) a resin composition obtained by mixing beforehand an acid anhydride curing agent, a surface active agent, a filler and a curing catalyst are prepared separately, and then the compositions (A) and (B) are mixed.

(2) (A) A resin composition obtained by mixing beforehand a polyfunctional epoxy resin, a surface active agent and a filler and (B) a resin composition obtained by mixing beforehand an acid anhydride curing agent, a surface active agent and a filler are prepared separately, and then the compositions (A) and (B) and a curing catalyst are mixed.

The method (2) is the most preferable from the viewpoint of pot life.

The reason why the thermoplastic resin composition of the present invention is excellent in moisture resistance is as follows. (A) A spherical filler having an average particle diameter of 0.1-0.9 μm is added to (B) a coarse particle silica having an average particle diameter of 3-9 μm so as to give a ratio of A/(A+B) of 1%-7% by weight, whereby the spherical filler is adhered onto the coarse particle filler and a small spherical filler (A) is in the service of a filler and the particle size distribution is widened to permit closest packing. Resultantly, the viscosity at the time of casting operation can be lowered without causing sedimentation and void development is reduced. At the same time, the probability of the filler particles striking one another is reduced and the path for water penetration is lengthened.

The reason why the molded coil of the present invention is excellent in resistance to moisture and resistance to cracking is that the coil is formed by casting and curing the thermosetting resin composition mentioned above.

The reason why the panel of the present invention is excellent in resistance to heat cycle is that a part of the molded coil has been rendered free of thermal elongation.

Figure 1:
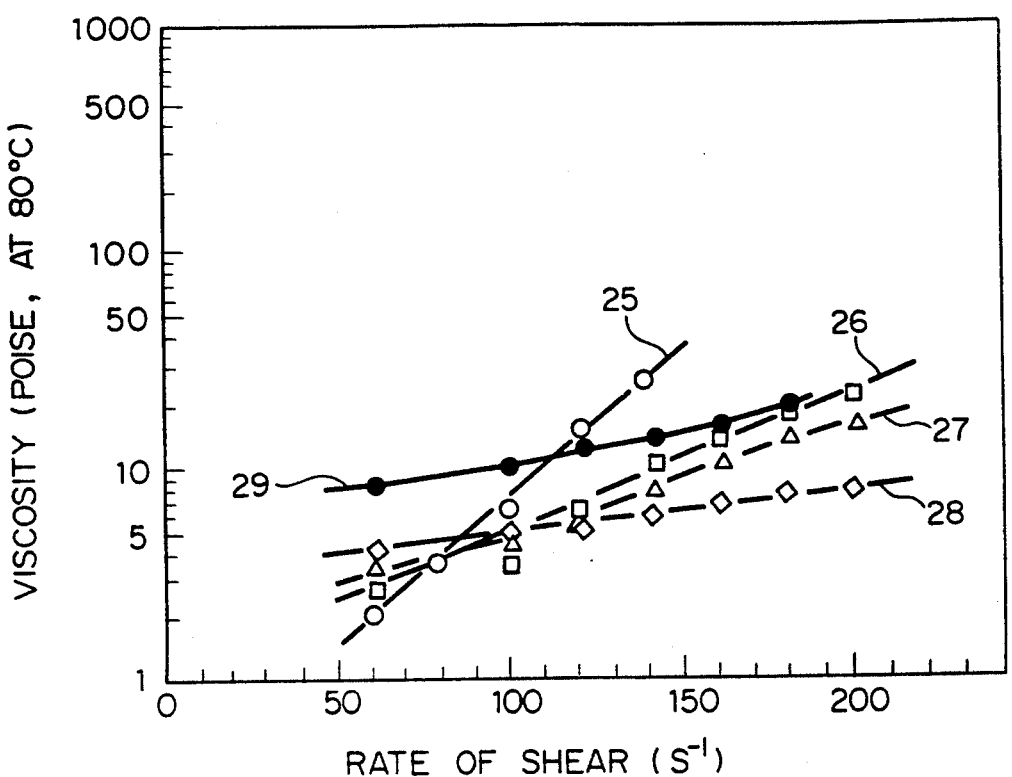
FIG. 1 is a graph showing a relation between the rate of shear and the viscosity.

In the respective drawings, numeral 1 is a coil, 2 is a conductor, 3 is a glass backing impregnated mica tape, 4 and 24 are each the cured product of a thermosetting resin composition, 5 is a terminal, 11 is concrete or resin concrete, 12 is a driving coil, 13 is a levitation guide coil, 14 is a bolt, 15 and 25 are each a spacer, 16 is a groove, 17 is a FRP or SMC spacer, 21 and 21' are each a metallic mold, 22 is an Al conductor, 25 is a thermosetting resin composition filled with 640 g of a crystalline silica C-BASE-1 having an average particle diameter of 4.5 $\mu$m and 0 (zero) g of a spherical silica SO-25R having an average particle of 0.8 $\mu$m, 26 is a thermosetting resin composition filled with 640 g of a crystalline silica C-BASE-1 having an average particle diameter of 4.5 $\mu$m and 6.4 g of a spherical silica SO-25R having an average particle diameter of 0.8 $\mu$m, 27 is a thermosetting resin composition filled with 640 g of a crystalline silica C-BASE-1 having an average particle diameter of 4.5 $\mu$m and 20 g of a spherical silica SO-25R having an average particle diameter of 0.8 $\mu$m, 29 is a thermosetting resin composition filled with a crystalline silica C-BASE-1 having an average particle diameter of 4.5 $\mu$m and 70 g of a spherical silica SO-25R having an average particle diameter of 0.8 $\mu$m; 30, 31, 32, 33, 34, and 35 are respectively a data obtained in warm water in Examples 38, 43, 44, 47, 49 and 50; 36, 37, and 38 are respectively a data obtained in an airconditioned chamber of 90% humidity in Examples 38, 43 and 44; 40 is a thermosetting resin composition filled with 640 g of a crystalline silica C-BASE-1 having an average particle diameter of 4.5 $\mu$m and 20 g of a spherical silica SO-32H having an average diameter of 1.8 $\mu$m, 41 is a thermosetting resin composition filled with 640 g of a crystalline silica C-BASE-1 having an average particle diameter of 4.5 $\mu$m and 20 g of a spherical silica SO-15R having an average particle diameter of 0.58 $\mu$m, 42 is a thermosetting resin composition filled with 640 g of a crystalline silica C-BASE-1 having an average particle diameter of 4.5 $\mu$m and 25 g of a spherical silica SO-05R having an average particle diameter of 0.1 $\mu$m, 43 is a thermosetting resin composition filled with 640 g of a crystalline silica C-BASE-1 having an average particle diameter of 4.5 $\mu$m and 20 g of a crystalline silica x having an average particle diameter of 0.8 $\mu$m, 44 is a thermosetting resin composition filled with 640 g of a crystalline silica C-BASE-1 having an average particle diameter of 4.5 $\mu$m and 20 g of a crystalline silica 5× having an average particle diameter of 1.0 $\mu$m, 45 is a thermosetting resin composition filled with 440 g of a fused silica Y-60 having an average particle diameter of 5.0 $\mu$m and 0 (zero) g of a spherical silica SO-25R having an average particle diameter of 0.8 $\mu$m, and 46 is a thermosetting resin composition filled with 440 g of a fused silica Y-60 having an average particle diameter of 5.0 $\mu$m and 10 g of a spherical silica SO-25R having an average particle diameter of 0.8 $\mu$m.

DESCRIPTION OF THE PREFERRED EMBODIMENTS

The present invention will be described in more detail below with reference to Examples, but the invention is not limited thereby.

The meanings of the abbreviations or symbols used for the multifunctional epoxy resins, curing agents, maleimides, curing catalysts, surface active agents, fillers, etc. in Examples are as follows.

DER-332: Diglycidyl ether of bisphenol A, epoxy equivalent 175
EP-828: Diglycidyl ether of bisphenol A, epoxy equivalent 185
EP-807: Diglycidyl ether of bisphenol F, epoxy equivalent 170
PY-302-2: Diglycidyl ether of bisphenol AF, epoxy equivalent 175
DGEBAD: Diglycidyl ether of bisphenol AD, epoxy equivalent 173
HN-5500: Methylhexahyirophthalic anhydride, acid anhydride equivalent 168
HN-2200: Methyltetrahydrophthalic anhydride, acid anhydride equivalent 166
DAPP-BMI: N,N'-4,4'-Bis(p-phenoxy)diphenylmethane bismaleimide
BMI: N,N'-4,4'-Diphenylmethane bismaleimide
DABF: Diallylbisphenol F
TAIC: Triallyl isocyanurate
BTPP-K: Tetraphenyl borate of triphenylbutylphosphine
2E4MZ-K: Tetraphenyl borate of 2-ethyl-4-methylimidazole
2E4MZ-CN-K: Tetraphenyl borate of 1-cyanoethyl-2-ethyl-4-methylimidazole
TEA-K: Tetraphenylborate of triethylamine
TPP-K: Tetraphenyl borate of triphenylphosphine
TPP: Triphenylphosphine
IOZ: Salt of 2-ethyl-4-methylimidazole and zinc octoate
YPH-201: Amine imide obtained by reacting a monocarboxylic acid alkyl ester with hydrazines and monoepoxy compounds, (YPH-201, a trade name, mfd. by Yuka-Shell K.K.)
CP-66: Aliphatic sulfonium salt of BRONSTED acid (Adeka Opton, a trade name, mfd. by Asahi Denka Kogyo K.K.)
PX-4BT: Tetrabutylphosphonium·benzotriazolate
BF$_3$-400: Boron trifluoride salt of piperazine
BF$_3$-100: Boron trifluoride salt of triethylamine
E4MZ-CNS: Trimellitic acid salt of 2-ethyl-4-methylimidazole
E4MZ-OK: Isocyanuric acid salt of 2-ethyl-4-methylimidazole
MC-C11Z-AZINE: Microcapsule of 1-azine-2-undecylimidazole
E4MZ-CN: 1-Cyanoethyl-2-ethyl-4-methylimidazole
KBM-403: $\gamma$-Glycidoxypropyltrimethoxysilane
KBM-303: $\beta$-(3,4-Epoxycyclohexyl)ethyltrimethoxysilane
KBM-803: $\gamma$-Aminopropyltriethoxysilane
KBM-903: $\gamma$-Aminopropyltriethoxysilane
KBM-603: N-$\beta$-(Aminoethyl)-$\gamma$-aminopropyl-trimethoxysilane
S-181: Isopropyl isostearoyl titanate
KR-2S: Isopropyl trioctanoyl titanate
AL-M: Ethylacetoacetatealuminum diisopropylate
AL-T: Aluminum tris(ethylacetoacetate)
3K-S: Crystalline silica
  Average particle diameter 23.3 $\mu$m, Cumulative particle distribution 100% at 60 $\mu$m or below
D: Crystalline silica
  Average particle diameter 10.0 $\mu$m, Cumulative particle distribution 100% at 60 $\mu$m or below
CMC-12: Crystalline silica
  Average particle diameter 5.0 $\mu$m, Cumulative particle distribution 100% at 48 $\mu$m or below 5X: Crystalline silica
  Average particle diameter 1.0 μm, Cumulative particle distribution 100% at 10 μm or below, 60% at 1 μm or below
C-BASE-1: Crystalline silica
  Average particle diameter 4.5 μm, Cumulative particle distribution 100% at 48 μm or below
C-BASE-2: Crystalline silica
  Average particle diameter 5.4 μm Cumulative particle distribution 100% at 48 μm or below
C-BASE-4: Crystalline silica
  Average particle diameter 6.2 μm Cumulative particle distribution 100% at 48 μm or below
C-BASE-5: Crystalline silica
  Average particle diameter 7.1 μm, Cumulative particle distribution 100% at 48 μm or below
C-BASE-6: Crystalline silica
  Average particle diameter 8.2 μm, Cumulative particle distribution 100% at 48 μm or below
RD-8: Fused silica
  Average particle diameter 12.0 μm, Cumulative particle distribution 100% at 80 μm or below
Y-60: Fused silica
  Average particle diameter 5.0 μm, Cumulative particle distribution 100% at 48 μm or below
SO-32H: Spherical silica
  Average particle diameter 1.8 μm, Cumulative particle distribution 50% at 1 μm or below
SO-25R: Spherical silica
  Average particle diameter 0.8 μm, Cumulative particle distribution 90% at 1 μm or below
SO-15R: Spherical silica
  Average particle diameter 0.5 μm, Cumulative particle distribution 98% at 1 μm or below
SO-05R: Spherical silica
  Average particle diameter 0.1 μm, Cumulative particle distribution 100% at 1 μm or below
Aerosil: Spherical silica
  Average particle diameter 0.02 μm, Cumulative particle distribution 100% at 1 μm or below
X: Crystalline silica
  Average particle diameter 0.8 μm, Cumulative particle distribution 90% at 1 μm or below C-BASE-1, C-BASE-2, C-BASE-4, C-BASE-5 and C-BASE-6 were obtained by varying the grinding time of a crystalline silica. The larger the number, the shorter the grinding time.

Multifunctional epoxy resin A was synthesized in the following manner.

Synthesis Example of multifunctional epoxy resin A

In a reactor fitted with a thermometer, a stirrer, a dropping funnel and a reaction water recovery apparatus, were placed 100 g of bis(4-hydroxyphenyl)methane, 114 g of bis(4-hydroxyphenyl)propane and 925 g of epichlorohydrin. Then, 175 g of 48 wt % aqueous sodium hydroxide solution was added dropwise thereto while heating and stirring over a period of 2 hours. During the reaction, water and epichlorohydrin were distilled out from the reaction mixture and epichlorohydrin alone was returned to the reactor so as to keep the concentration of water in the reaction mixture at 5 wt % or below. After completion of the dropwise addition of the aqueous sodium hydroxide solution, heating was continued for further 15 minutes to remove water completely, and then unreacted epichlorohydrin was distilled off. The raw product obtained was dissolved by addition of about 55 g of toluene to facilitate the separation of sodium chloride from the raw product, and the mixture was filtered to remove sodium chloride. The filtrate was then heated up to 170° C. at 2 mmHg to distill off toluene completely, whereby a pale yellow multifunctional epoxy resin A was obtained. The multifunctional epoxy resin showed an epoxy equivalent of 173 and a hydrolyzable chlorine content of 100 ppm.

The properties of resin compositions were evaluated in the following manner.

Evaluation of properties

Determination of heat conductivity

Discs formed by casting and curing a thermosetting resin composition to a size of 50 mm in diameter and 9 mm in thickness were used as the test pieces. The heat conductivity was determined by use of a heat conductivity measuring apparatus, Type TCHM-1 (mfd. by DYNATECH R/D COMPANY).

Cracking resistance test

Figure 17A:
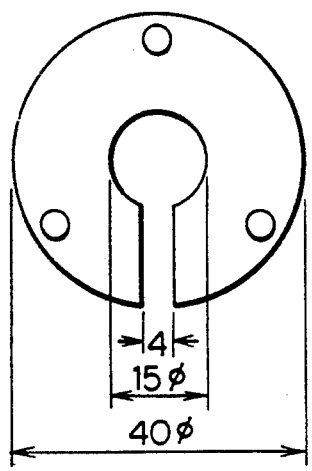
FIGS. 17A and 17B are respectively a front view and a sectional view of a C-shaped washer.
Figure 17B:
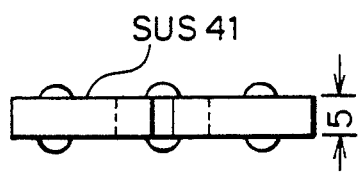
Figure 17C:
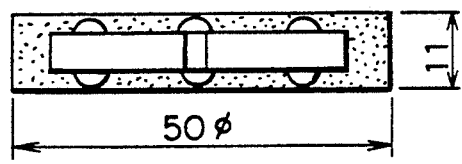
FIG. 17C is a sectional view of a test piece prepared by casting and curing a thermosetting resin composition for insulating high-voltage coil.

Test pieces were prepared by casting and curing a thermosetting resin composition into a C-shaped washer of 5 mm thickness made of SUS 304 shown in FIG. 17. Thereafter, the test piece was allowed to stand in an air-conditioned chamber kept at a predetermined temperature and a humidity of 98% or in a warm water of predetermined temperature for 180 days and then subjected to cracking resistance test. The cracking resistance test was conducted by keeping the test piece at 90° C. for 1 hour, then holding it in a constant temperature bath kept at a predetermined temperature and observing the condition of crack development. When no crack developed after completion of 2 cycles at each temperature, the temperature was further decreased by 10° C. and a similar test was conducted. The temperatures described in Examples are those at which the test pieces passed the test.

Determination of viscosity

The viscosity of a thermosetting resin composition at a high rate of shear was determined by using a vibration type viscometer.

Moisture resistance test

Test pieces were placed in an air-conditioned chamber kept at a predetermined temperature and a humidity of 98% and taken out at predetermined time intervals. The test piece was immediately subjected to determination of flexural property while water is adherent thereto. Separately, the surface water was wiped away with cloth immediately after the test piece was taken out, and the insulation resistance of the test piece was determined immediately.

Water resistance test

Test pieces were immersed in a warm water of predetermined temperature and taken out at predetermined time intervals. The test piece was immediately subjected to determination of flexural property while warm water was adherent thereto. Separately, the surface water was wiped away with cloth immediately after the test piece was taken out and the insulation resistance was determined immediately.

EXAMPLE 1

Thermoplastic resin compositions for casting high-voltage coils were prepared by thoroughly mixing and stirring 100 g of multifunctional epoxy resin A, 95 g of HN-5500, 5 g of KBM-403, 2 g of S-181, 0.2 g of 2E4MZ-CN, 640 g of a crystalline silica, C-BASE-1, having an average particle diameter of 4.5 μm, and 0 g or 6.5 g or 20 g or 30 g or 70 g of a spherical silica, SO-25R, having an average particle diameter of 0.8 μm. The viscosities at 80° C. of the thermosetting resin compositions for casting high-voltage coils obtained were determined by using a vibration type viscometer. The relations between the rate of shear and the viscosity at 80° C. thus obtained are collectively shown in FIG. 1. In FIG. 1, numerals 25, 26, 27, 28 and 29 respectively refer to the data obtained when the amount of 0-25R added is 0 g, 0.5 g, 20 g, 30 g and 70 g. When the spherical silica having an average particle diameter of 0.8 μm is added to the crystalline silica having an average particle diameter of 4.5 μm, the degree of development of dilatancy is decreased. That is, the viscosity at a low rate of shear increases with the increase of the amount of spherical silica having an average particle diameter of 0.8 μm. However, the viscosity at a high rate of shear near to that of a flow passing through a pipe in actual casting operations decreases to a certain extent, conversely, with the increase of the amount of the spherical silica having an average particle diameter of 0.8 μm added. However, when the amount of the spherical silica having an average particle diameter of 0.8 μm added increases from 30 g to 70 g, the viscosity at a high rate of shear near to that of a flow passing through a pipe in actual casting operations tends to increase with the increase of the amount of the spherical silica having an average diameter of 0.8 μm added.

The thermosetting resin compositions for casting high-voltage coils were cured by heating at 130° C. for 2 hours and further at 150° C. for 5 hours. No sedimentation occurred except when the amount of SO-25R added was 0 (zero) g.

EXAMPLE 2

Figure 2:
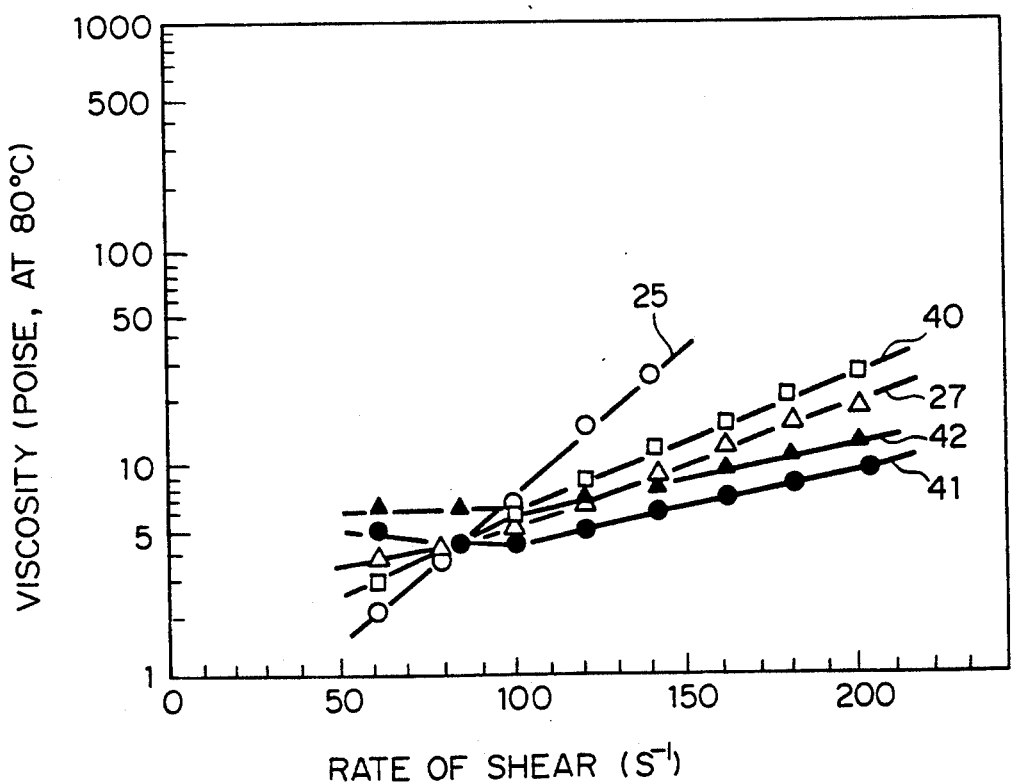
FIG. 2 is a graph showing a relation between the rate of shear and the viscosity.

Thermosetting resin compositions for casting high-voltage coils were prepared by thoroughly mixing and stirring 100 g of multifunctional epoxy resin A, 95g of HN-5500, 5 g of KBM-403, 2 g of S-181, 0.2 g of 2E4MZ-CN, 640 g of a crystalline silica, C-BASE-1, having an average particle diameter of 4.5 μm, and 20 g of a spherical silica, SO-32H, having an average particle diameter of 1 8 μm, or 20 g of a spherical silica, SO-15R, having an average particle diameter of 0.58 μm, or 20 g of a spherical silica, SO-05R, having an average particle diameter of 0.1 μm. The viscosities at 80° C. of the thermosetting resin compositions for casting high-voltage coils obtained were determined by using a vibration type viscometer. The relations between the rate of shear and the viscosity at 80° C. thus obtained are collectively shown in FIG. 2. In FIG. 2, numerals 25, 27, 40, 41 and 42 respectively refer to the data obtained when 0 (zero) g of spherical silica 20 g of spherical silica SO-25R having an average particle diameter of 0.8 μm, 20 g of spherical silica SO-32H having an average particle diameter of 1.8 μm, 20 g of spherical silica SO-15R having an average particle diameter of 0.58 μm and 20 g of spherical silica SO-05R having an average particle diameter of 0.1 μm were used respectively. When the spherical silicas having an average particle diameter of 0.1 μm to 1.8 μm are added to the crystalline silica having an average particle diameter of 4.5 μm, the degree of development of dilatancy inherent to the crystalline silica is decreased. That is, the viscosity at a low rate of shear increases with the increase of the amount of spherical silica added. However, the viscosity at a high rate of shear near to that of a flow passing through a pipe in actual casting operations decreases with the increase of the amount of spherical silica added.

The thermosetting resin compositions for casting high-voltage coils were cured by heating at 130° C. for 2 hours and further at 150° C. for 5 hours. No sedimentation occurred except when no spherical silica was added.

COMPARATIVE EXAMPLE 1

Figure 3:
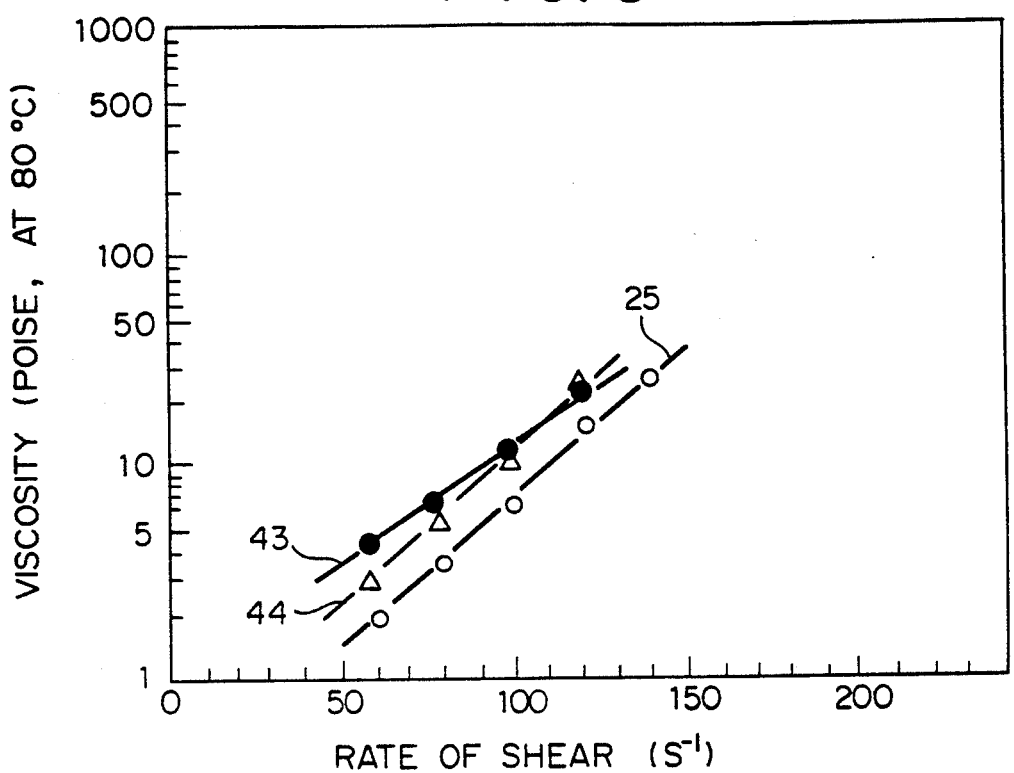
FIG. 3 is a graph showing a relation between the rate of shear and the viscosity.
Figure 4:
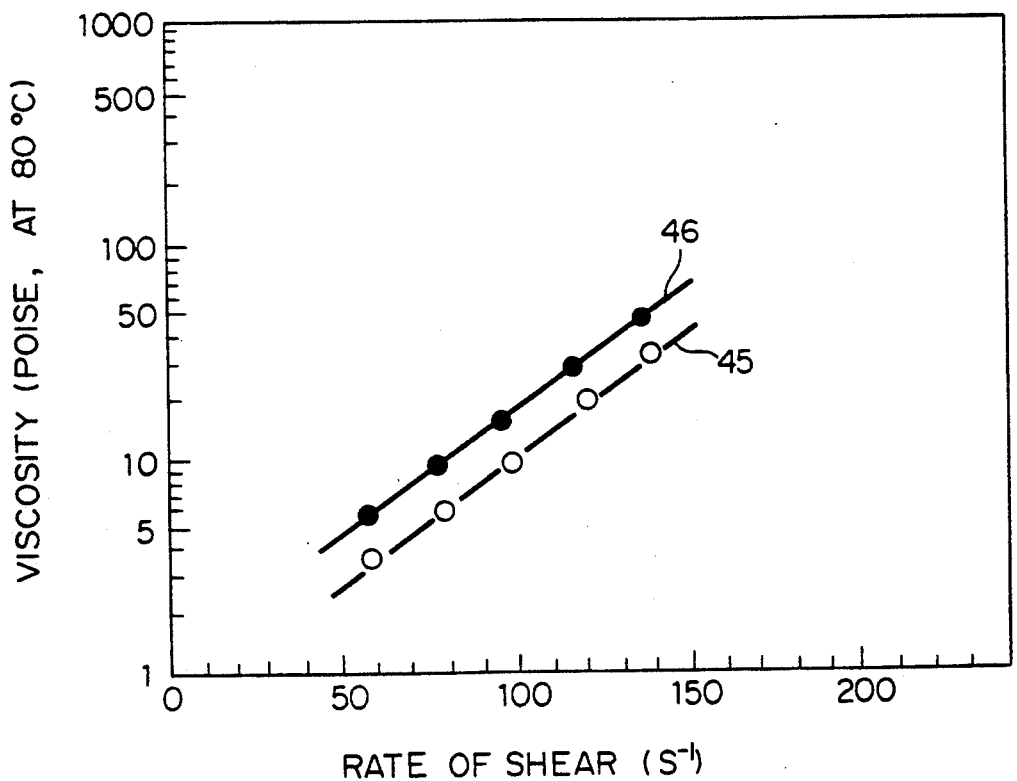
FIG. 4 is a graph showing a relation between the rate of shear and the viscosity.

Thermosetting resin compositions were prepared by thoroughly mixing and stirring 100 g of multifunctional epoxy resin A, 95 g of HN-5500, 5 g of KBM-403, 2 g of S-181, 0.2 g of 2E4MZ-CN, 640 g of crystalline silica C-BASE-1 having an average particle diameter of 4.5 μm, and 20 g of a spherical silica, Aerosil, having an average particle diameter of 0.02 μm, or 20 g of crystalline silica X having an average particle diameter of 0.8 μm, or 20 g of crystalline silica 5X having an average particle diameter of 1 μm. The viscosities of these thermosetting resin compositions at 80° C. were determined by using a vibration type viscometer. The relations between the rate of shear and the viscosity at 80° C. thus obtained are collectively shown in FIG. 3. In FIG. 3, numerals 25, 43, and 44 respectively refer to the data obtained when no silica, 20 g of crystalline silica X having an average particle diameter of 0.8 μm, and 20 g of crystalline silica 5X having an average particle diameter of 1 μm were added, respectively. When the spherical silica having an average particle diameter of 0.02 μm is added crystalline silica having an r average particle diameter of 4.5 μm, the resultant viscosity is too high and makes the casting operation impossible. When the crystalline silicas having an average particle diameter of 0.8 μm to 1.0 μm are added to the crystalline silica having an average particle diameter of 4.5 μm, the degree of development of dilatancy is increased.

EXAMPLES 3 TO 40, COMPARATIVE EXAMPLES 3 TO 5

Mixtures were obtained according to the compounding ratio shown in Tables 1–6 and stirred thoroughly. Curing catalysts were added to the resulting mixture in compounding ratios shown in Tables 1–6 and mixed thoroughly to obtain thermosetting resin compositions for casting high-voltage coils. Each of the thermosetting resin compositions for casting high-voltage coils obtained was cast into a mold having a releasing agent baked thereonto, and then heated at 130° C. for 2 hours and further at 150° C. for 5 hours to obtain a transparent brown cured product. The cured product was examined for its linear expansion coefficient, heat conductivity and cracking resistance by the C-shaped washer method. The results are shown in Tables 1–6. Independently, pieces of the cured product were allowed to stand in a warm water kept at a predetermined temperature and in an air-conditioned chamber of 90% humidity, then taken out at predetermined time intervals, and immediately tested in a wet state for flexural property at room temperature, from which the retention of flexural strength was calculated. Separately, the water on the surface was wiped away with cloth, and immediately the insulation resistance was determined. The results thus obtained are shown in Tables 1–6. It is to be added here that when the deterioration of property of the cured product in a wet state was not marked, the property recovered to the initial level upon drying the cured product which had absorbed moisture or water.

EXAMPLES 41 TO 54

Figure 5:
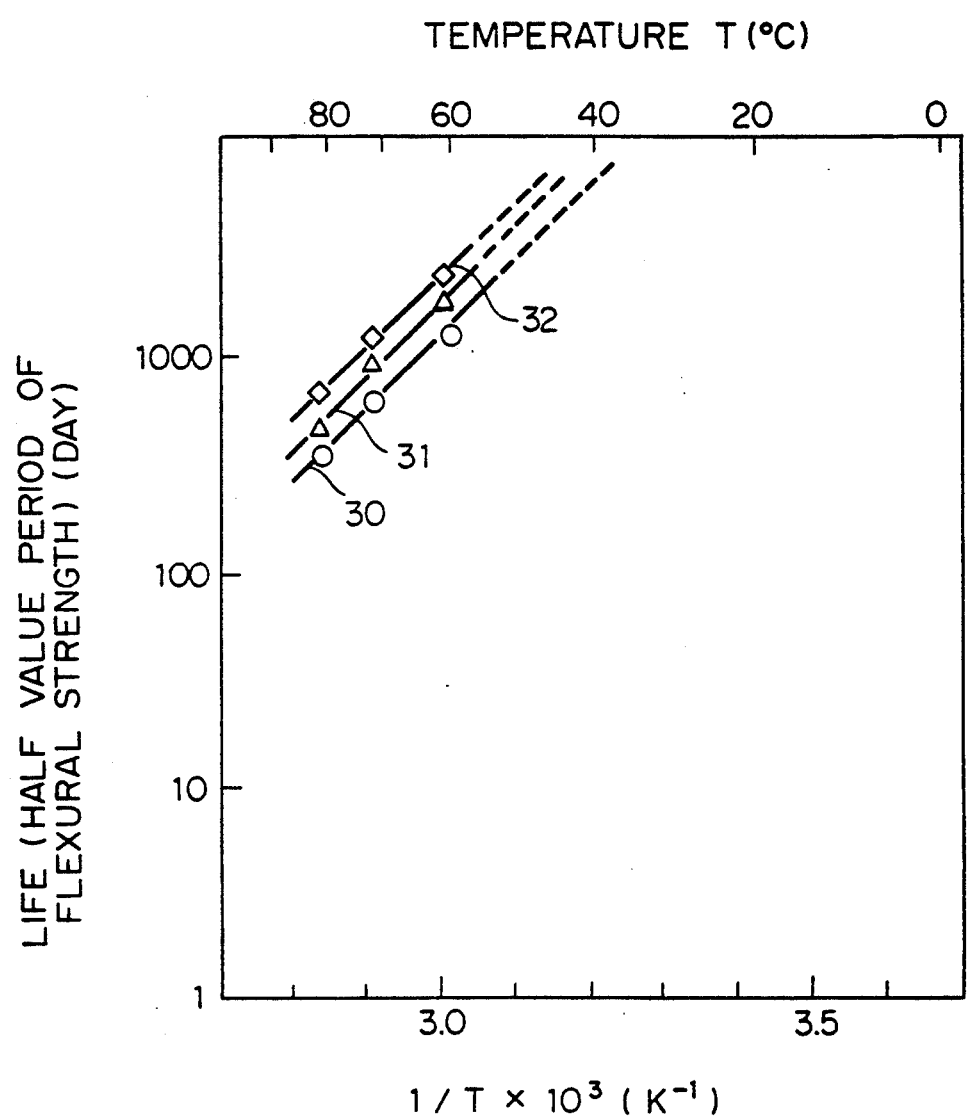
FIG. 5 is a graph showing a relation between the life of a bending test piece immersed in water or placed in an atmosphere of 98% humidity and the inverse number of absolute temperature.
Figure 6:
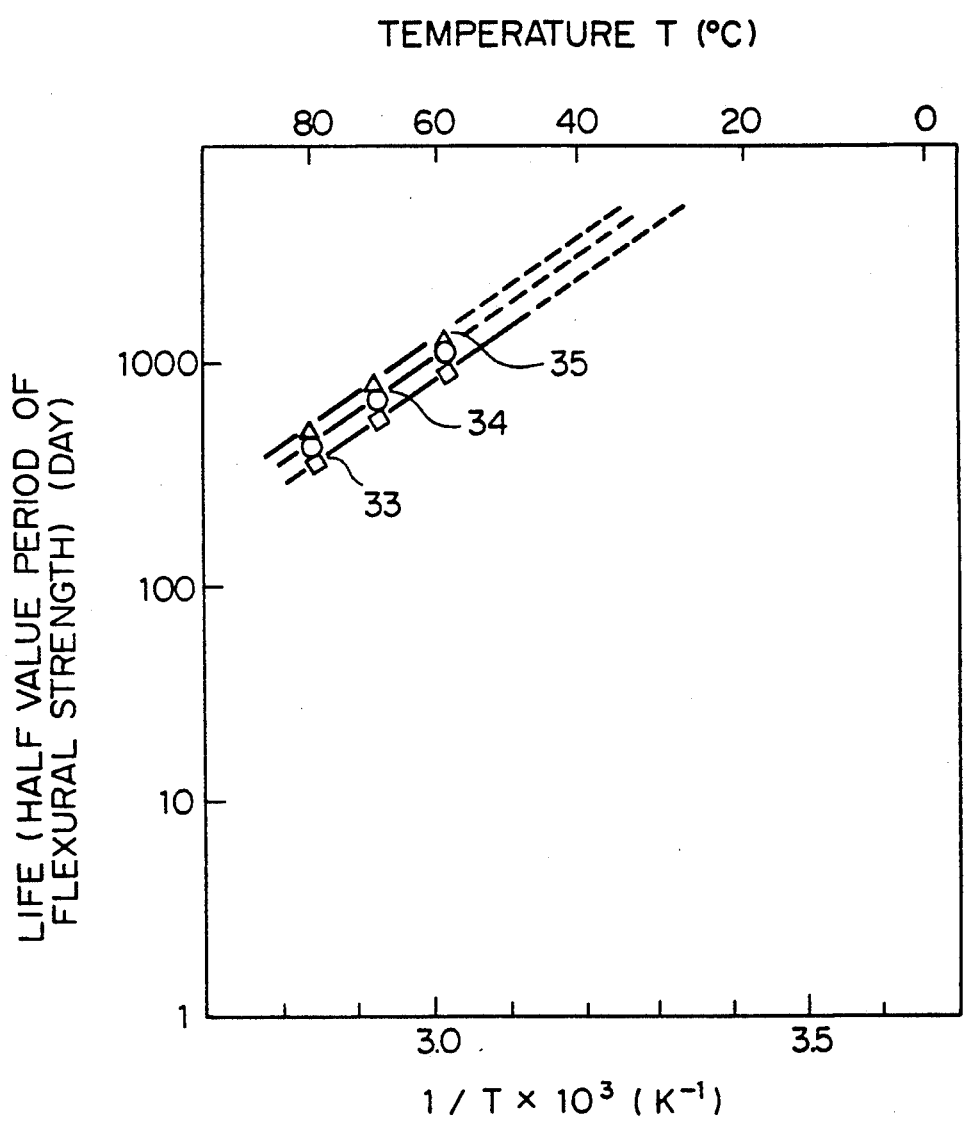
FIG. 6 is a graph showing a relation between the life of a bending test piece immersed in water or placed in an atmosphere of 98% humidity and the inverse number of absolute temperature.
Figure 7:
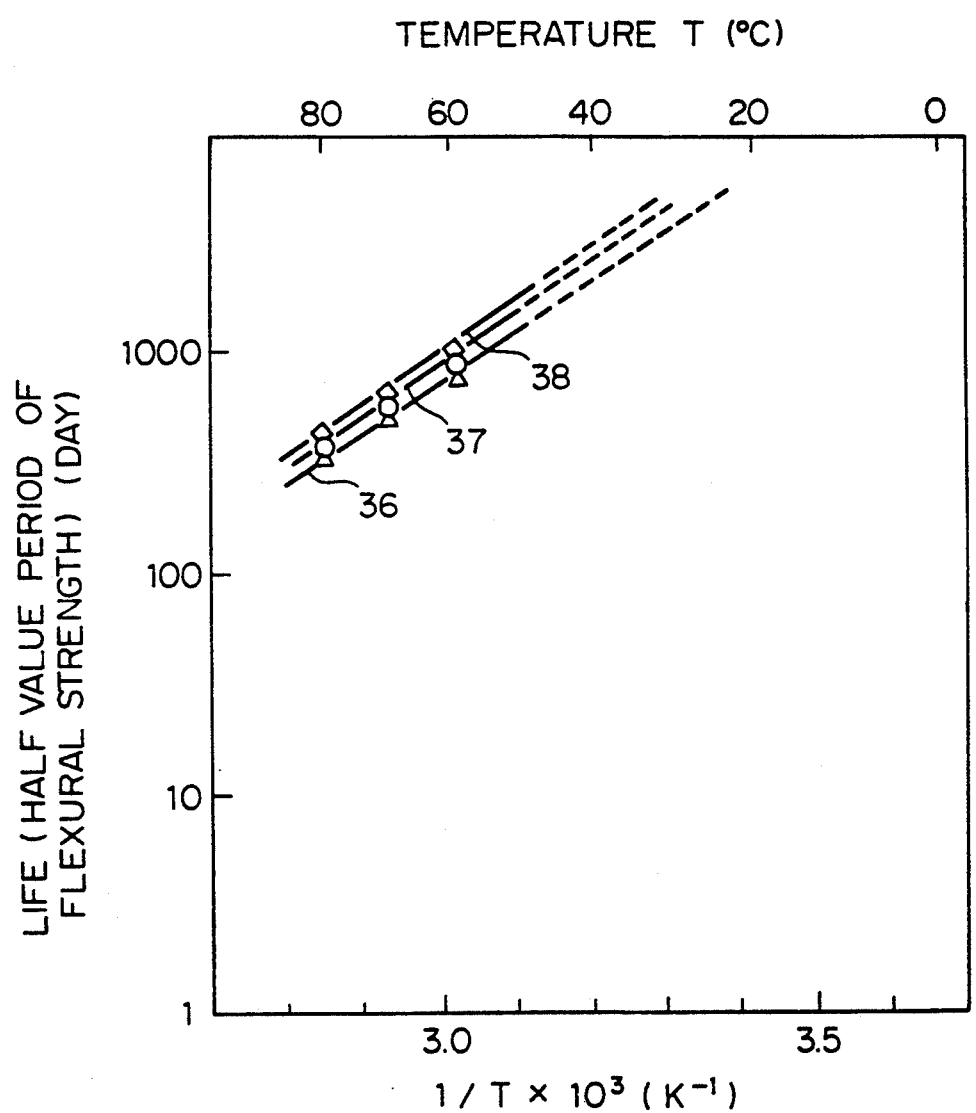
FIG. 7 is a graph showing a relation between the life of a bending test piece immersed in water or placed in an atmosphere of 98% humidity and the inverse number of absolute temperature.

Multifunctional epoxy resins, acid anhydride curing agents, fillers and surface active agents were mixed in compounding ratios shown in Tables 7, 8. Curing catalysts were added to the mixtures obtained above in compounding ratios shown in Tables 7, 8 and mixed and stirred thoroughly to obtain thermosetting resin compositions for casting high-voltage coils. The thermosetting resin composition for casting high-voltage coils obtained was cast into a mold having a releasing agent baked thereonto, and heated at 130° C. for 2 hours and further at 150° C. for 5 hours to obtain a transparent brown cured product. The cured product was examined for its linear expansion coefficient, heat conductivity and cracking resistance by the C-shaped washer method. The results are shown in Tables 7, 8. Independently, pieces the cured product were allowed to stand in a warm water kept at a predetermined temperature and in an air-conditioned chamber of 90% humidity, then taken out at predetermined time intervals, and immediately tested in a wet state for flexural property at room temperature, from which the retention of flexural strength was calculated. Separately the water on the surface was wiped away with cloth, and immediately the insulation resistance was determined. The results thus obtained are shown in Tables 7, 8. The time at which the flexural strength decreased to half was defined as the life, and Arrhenius plots were prepared, that is, the relation between the life and the inverse number of absolute temperature was plotted as graphs. Some of the results are shown in FIGS. 5 to 7. In FIGS. 5 to 7, numerals 30, 31, 32, 33, 34 and 35 respectively refer to the data obtained in warm water in Examples 42, 47, 48, 49, 53 and 54 and numerals 36, 37 and 38 respectively refer to the data obtained in an air-conditioned chamber of 90% humidity in Examples 42, 47 and 48. As is revealed from FIGS. 5 to 7, it can be estimated that when the cured product of the thermosetting resin composition for casting high-voltage coils of the present invention is immersed in water or placed in an atmosphere of 98% humidity, it has a life of 15 years or more at room temperature in both cases. On the other hand, the cured product was allowed to stand in a warm water kept at a predetermined temperature and in an air-conditioned chamber of 90% humidity for 180 days, and then subjected to cracking resistance test. When the flexural strength was determined, thereafter, the flexural strength was at least $\frac{2}{3}$ of the initial value and the insulation resistance was at least $1 \times 10^{11}$ Ω·cm in both cases.

TABLE 1

| | Example 3 | Example 4 | Example 5 | Example 6 | Example 7 | Example 8 | Example 9 |
|---|---|---|---|---|---|---|---|
| Multifunctional epoxy resin (part) | PY-302-2 (100) | PY-302-2 (100) | PY-302-2 (100) | PY-302-2 (100) | PY-302-2 (100) | PY-302-2 (100) | PY-302-2 (100) |
| Acid anhydride curing agent (part) | NH-5500 (95) | NH-5500 (95) | HN-5500 (95) | HN-5500 (95) | HN-5500 (95) | HN-5500 (95) | HN-5500 (95) |
| Filler (part) | C-BASE-1 (640) SO-25R (20) | C-BASE-1 (660) SO-15R (20) | C-BASE-1 (680) SO-25R (20) | C-BASE-2 (700) SO-25R (30) | C-BASE-4 (800) SO-25R (40) | C-BASE-5 (850) SO-25R (40) | C-BASE-5 (900) SO-25R (50) |
| Surface active agent (part) | KBM-403 (4.0) S-181 (2.0) | KBM-403 (4.5) S-181 (2.0) | KBM-403 (4.5) S-181 (2.5) | KBM-403 (5.0) S-181 (2.5) | KBM-403 (6.0) S-181 (3.0) | KBM-403 (7.0) S-181 (3.5) | KBM-403 (8.0) S-181 (4.0) |
| Curing catalyst (part) | PX-4BT (0.5) | PX-4BT (0.5) | PX-4BT (0.5) | PX-4BT (0.5) | PX-4BT (0.5) | PX-4BT (0.5) | PX-4BT (0.5) |
| Linear expansion coefficient ($\times 10^{-5}$ deg$^{-1}$) | 2.4 | 2.3 | 2.3 | 2.2 | 2.2 | 2.1 | 2.1 |
| Heat conductivity (W·m$^{-1}$·K$^{-1}$) | 1.35 | 1.36 | 1.42 | 1.53 | 1.68 | 1.75 | 1.85 |
| Cracking resistance (C-shaped washer method) | −40° C. | −40° C. | −40° C. | −40° C. | −40° C. | −40° C. | −40° C. |
| Insulation resistance after moisture absorption (after 180 days, Ω·cm) | $7.5 \times 10^{11}$ | $7.5 \times 10^{11}$ | $7.5 \times 10^{11}$ | $7.0 \times 10^{11}$ | $6.4 \times 10^{11}$ | $6.0 \times 10^{11}$ | $5.8 \times 10^{11}$ |
| Insulation resistance after moisture absorption (after 180 days, Ω·cm) | $8.5 \times 10^{11}$ | $8.3 \times 10^{11}$ | $8.2 \times 10^{11}$ | $8.1 \times 10^{11}$ | $7.5 \times 10^{11}$ | $7.0 \times 10^{11}$ | $6.5 \times 10^{11}$ |
| Flexural strength retention (after 180 days, %) | 86 | 85 | 86 | 82 | 79 | 76 | 74 |

TABLE 2

| | Example 10 | Example 11 | Example 12 | Example 13 | Example 14 | Example 15 | Example 16 |
|---|---|---|---|---|---|---|---|
| Multifunctional epoxy resin (part) | PY-302-2 (100) | PY-302-2 (100) | PY-302-2 (100) | EP-807 (100) | DER-332 (100) | EP-828 (100) | DGEBAD (100) |
| Acid anhydride curing agent (part) | HN-5500 (95) | HN-5500 (95) | HN-2200 (93) | HN-5500 (92) | HN-5500 (92) | HN-5500 (91) | HN-5500 (95) |
| Filler (part) | C-BASE-1 (600) SO-25R (30) | C-BASE-1 (560) SO-25R (50) | C-BASE-1 (600) SO-25R (30) | C-BASE-1 (640) SO-25R (20) | C-BASE-1 (640) SO-25R (20) | C-BASE-1 (640) SO-25R (20) | C-BASE-1 (640) SO-25R (20) |
| Surface active agent (part) | KBM-403 (3.0) S-181 (1.0) | KBM-403 (3.0) S-181 (1.0) | KBM-403 (3.0) S-181 (1.0) | KBM-403 (4.0) S-181 (2.0) | KBM-403 (4.0) S-181 (2.0) | KBM-403 (4.0) S-181 (2.0) | KBM-403 (4.0) S-181 (2.0) |
| Curing catalyst (part) | PX-4BT (0.5) | PX-4BT (0.5) | PX-4BT (0.5) | PX-4BT (0.5) | PX-4BT (0.5) | PX-4BT (0.5) | PX-4BT (0.5) |

TABLE 2-continued

| | Example 10 | Example 11 | Example 12 | Example 13 | Example 14 | Example 15 | Example 16 |
|---|---|---|---|---|---|---|---|
| Linear expansion coefficient ($\times 10^{-5} \deg^{-1}$) | 2.4 | 2.5 | 2.4 | 2.4 | 2.4 | 2.5 | 2.5 |
| Heat conductivity ($W \cdot m^{-1} \cdot K^{-1}$) | 1.25 | 0.96 | 1.22 | 1.32 | 1.34 | 1.33 | 1.34 |
| Cracking resistance (C-shaped washer method) | −40° C. | −40° C. | −40° C. | −40° C. | −40° C. | −40° C. | −40° C. |
| Insulation resistance after moisture absorption (after 180 days, $\Omega \cdot cm$) | $2.3 \times 10^{12}$ | $4.4 \times 10^{12}$ | $2.3 \times 10^{11}$ | $1.2 \times 10^{12}$ | $9.8 \times 10^{11}$ | $8.5 \times 10^{11}$ | $8.8 \times 10^{11}$ |
| Insulation resistance after moisture absorption (after 180 days, $\Omega \cdot cm$) | $7.5 \times 10^{13}$ | $8.3 \times 10^{12}$ | $7.5 \times 10^{11}$ | $2.5 \times 10^{12}$ | $2.1 \times 10^{12}$ | $1.2 \times 10^{12}$ | $1.1 \times 10^{12}$ |
| Flexural strength retention (after 180 days, %) | 93 | 95 | 86 | 89 | 85 | 84 | 83 |

TABLE 3

| | Example 17 | Example 18 | Example 19 | Example 20 | Example 21 | Example 22 | Example 23 |
|---|---|---|---|---|---|---|---|
| Compound (part) | PY-302-2 (100) HN-5500 (95) | PY-302-2 (100) HN-5500 (95) | PY-302-2 (100) HN-5500 (95) | PY-302-2 (100) HN-5500 (95) DAPP-BM1 (15) | PY-302-2 (100) HN-5500 (95) DAPP-BM1 (15) | BM1 (100) DABF (90) TAIC (50) | BM1 (110) DABF (90) TAIC (30) |
| Filler (part) | C-BASE-1 (640) SO-25R (20) | C-BASE-1 (640) SO-25R (20) | C-BASE-1 (640) SO-25R (20) | C-BASE-1 (640) SO-25R (20) | C-BASE-1 (640) SO-25R (20) | C-BASE-1 (640) SO-25R (20) | C-BASE-1 (640) SO-25R (20) |
| Surface active agent (part) | KBM-403 (4.0) S-181 (2.0) | KBM-403 (4.0) S-181 (2.0) | KBM-403 (4.0) S-181 (2.0) | KBM-403 (4.0) S-181 (2.0) | KBM-403 (4.0) S-181 (2.0) | KBM-403 (4.0) S-181 (2.5) | KBM-403 (4.0) S-181 (2.0) |
| Curing catalyst (part) | PX-4BT (0.5) | PX-4BT (0.5) | PX-4BT (0.5) | PX-4BT (0.5) | PX-4BT (0.5) | PX-4BT (0.5) | PX-4BT (0.5) |
| Linear expansion coefficient ($\times 10^{-5} \deg^{-1}$) | 2.4 | 2.5 | 2.5 | 2.5 | 2.5 | 2.5 | 2.5 |
| Heat conductivity ($W \cdot m^{-1} \cdot K^{-1}$) | 1.35 | 1.32 | 1.32 | 1.33 | 1.31 | 1.33 | 1.32 |
| Cracking resistance (C-shaped washer method) | −40° C. | −40° C. | −40° C. | −40° C. | −40° C. | −40° C. | −40° C. |
| Insulation resistance after moisture absorption (after 180 days, $\Omega \cdot cm$) | $7.9 \times 10^{11}$ | $7.5 \times 10^{11}$ | $7.8 \times 10^{11}$ | $7.6 \times 10^{11}$ | $7.3 \times 10^{11}$ | $7.1 \times 10^{11}$ | $7.1 \times 10^{11}$ |
| Insulation resistance after moisture absorption (after 180 days, $\Omega \cdot cm$) | $8.2 \times 10^{11}$ | $8.3 \times 10^{11}$ | $8.2 \times 10^{11}$ | $8.3 \times 10^{11}$ | $8.8 \times 10^{11}$ | $8.2 \times 10^{11}$ | $8.2 \times 10^{11}$ |
| Flexural strength retention (after 180 days, %) | 84 | 83 | 83 | 84 | 81 | 82 | 80 |

TABLE 4

| | Example 24 | Example 25 | Example 26 | Example 27 | Example 28 | Example 29 | Example 30 |
|---|---|---|---|---|---|---|---|
| Multifunctional epoxy resin (part) | PY-302-2 (100) | PY-302-2 (100) | PY-302-2 (100) | PY-302-2 (100) | PY-302-2 (100) | PY-302-2 (100) | PY-302-2 (100) |
| Acid anhydride curing agent (part) | HN-5500 (95) | HN-5500 (95) | HN-5500 (95) | HN-5500 (95) | HN-5500 (95) | HN-5500 (95) | HN-5500 (95) |
| Filler (part) | C-BASE-1 (640) SO-25R (20) | C-BASE-1 (640) SO-25R (20) | C-BASE-1 (640) SO-25R (20) | C-BASE-1 (640) SO-25R (20) | C-BASE-1 (640) SO-25R (20) | C-BASE-1 (640) SO-25R (20) | C-BASE-1 (640) SO-25R (21) |
| Surface active agent (part) | KBM-403 (4.0) S-181 (2.0) | KBM-403 (4.0) S-181 (2.0) | KBM-403 (4.0) S-181 (2.0) | KBM-403 (4.0) S-181 (2.0) | KBM-403 (4.0) S-181 (2.0) | KBM-403 (4.0) S-181 (2.0) | KBM-403 (4.0) S-181 (2.0) |
| Curing catalyst (part) | PX-4BT (0.5) | PX-4BT (5.0) | 2E4MZ-K (5.0) | 2E4MZ-CN-K (5.0) | TEA-K (5.0) | TPP-K (5.0) | IOZ (0.2) |
| Linear expansion coefficient ($\times 10^{-5} \deg^{-1}$) | 2.5 | 2.4 | 2.4 | 2.4 | 2.4 | 2.4 | 2.4 |
| Heat conductivity ($W \cdot m^{-1} \cdot K^{-1}$) | 1.33 | 1.36 | 1.35 | 1.34 | 1.35 | 1.35 | 1.35 |
| Cracking resistance (C-shaped washer method) | −40° C. | −40° C. | −40° C. | −40° C. | −40° C. | −40° C. | −40° C. |
| Insulation resistance after moisture absorption (after 180 days, $\Omega \cdot cm$) | $7.6 \times 10^{11}$ | $7.5 \times 10^{11}$ | $7.5 \times 10^{11}$ | $7.7 \times 10^{11}$ | $7.4 \times 10^{11}$ | $7.5 \times 10^{11}$ | $7.8 \times 10^{11}$ |
| Insulation resistance after moisture absorption | $8.3 \times 10^{11}$ | $8.3 \times 10^{11}$ | $8.2 \times 10^{11}$ | $8.4 \times 10^{11}$ | $8.5 \times 10^{11}$ | $8.6 \times 10^{11}$ | $8.5 \times 10^{11}$ |

TABLE 4-continued

|  | Example 24 | Example 25 | Example 26 | Example 27 | Example 28 | Example 29 | Example 30 |
|---|---|---|---|---|---|---|---|
| (after 180 days, Ω · cm) |  |  |  |  |  |  |  |
| Flexural strength retention (after 180 days, %) | 84 | 85 | 86 | 85 | 84 | 86 | 84 |

TABLE 5

|  | Example 31 | Example 32 | Example 33 | Example 34 | Example 35 | Example 36 | Example 37 |
|---|---|---|---|---|---|---|---|
| Multifunctional epoxy resin (part) | PY-302-2 (100) | PY-302-2 (100) | PY-302-2 (100) | PY-302-2 (100) | PY-302-2 (100) | PY-302-2 (100) | PY-302-2 (100) |
| Acid anhydride curing agent (part) | HN-5500 (95) | HN-5500 (95) | HN-5500 (95) | HN-5500 (95) | HN-5500 (95) | HN-5500 (95) | HN-5500 (95) |
| Filler (part) | C-BASE-1 (640) SO-25R (20) | C-BASE-1 (640) SO-25R (20) | C-BASE-1 (640) SO-25R (20) | C-BASE-1 (640) SO-25R (20) | C-BASE-1 (640) SO-25R (20) | C-BASE-1 (640) SO-25R (20) | C-BASE-1 (640) SO-25R (20) |
| Surface active agent (part) | KBM-403 (4.0) S-181 (2.0) | KBM-403 (4.0) S-181 (2.0) | KBM-403 (4.0) S-181 (2.0) | KBM-403 (4.0) S-181 (2.0) | KBM-403 (4.0) S-181 (2.0) | KBM-403 (4.0) S-181 (2.0) | KBM-403 (6.0) |
| Curing catalyst (part) | YPH-201 (5.0) | CP-66 (0.5) | BF$_3$-400 (1.0) | BF$_3$-100 (1.0) | 2E4MZ-CNS (0.5) | 2E4MZ-OK (0.5) | PX-4BT (0.5) |
| Linear expansion coefficient ($\times 10^{-5}$ deg$^{-1}$) | 2.4 | 2.4 | 2.4 | 2.4 | 2.4 | 2.4 | 2.4 |
| Heat conductivity (W · m$^{-1}$ · K$^{-1}$) | 1.35 | 1.36 | 1.35 | 1.34 | 1.35 | 1.35 | 1.35 |
| Cracking resistance (C-shaped washer method) | −40° C. | −40° C. | −40° C. | −40° C. | −40° C. | −40° C. | −20° C. |
| Insulation resistance after moisture absorption (after 180 days, Ω · cm) | $7.8 \times 10^{11}$ | $3.5 \times 10^{11}$ | $5.5 \times 10^{11}$ | $5.7 \times 10^{11}$ | $8.4 \times 10^{11}$ | $9.5 \times 10^{11}$ | $3.5 \times 10^{11}$ |
| Insulation resistance after moisture absorption (after 180 days, Ω · cm) | $8.2 \times 10^{11}$ | $5.3 \times 10^{11}$ | $6.2 \times 10^{11}$ | $6.4 \times 10^{11}$ | $9.5 \times 10^{11}$ | $2.6 \times 10^{12}$ | $5.3 \times 10^{11}$ |
| Flexural strength retention (after 180 days, %) | 84 | 75 | 76 | 75 | 87 | 90 | 75 |

TABLE 6

|  | Example 38 | Example 39 | Example 40 | Comparative Example 3 | Comparative Example 4 | Comparative Example 5 |
|---|---|---|---|---|---|---|
| Multifunctional epoxy resin (part) | PY-302-2 (100) | PY-302-2 (100) | PY-302-2 (100) | PY-302-2 (100) | PY-302-2 (100) | PY-302-2 (100) |
| Acid anhydride curing agent (part) | HN-5500 (95) | HN-5500 (95) | HN-5500 (95) | HN-5500 (95) | HN-5500 (95) | HN-5500 (95) |
| Filler (part) | C-BASE-1 (640) SO-25R (20) | C-BASE-1 (640) SO-25R (20) | C-BASE-1 (640) SO-25R (20) | RD-8 (560) | Y-40 (560) | C-BASE-5 (600) |
| Surface active agent (part) | S-181 (6.0) | AL-T (5.0) | AL-M (5.0) | KBM-403 (4.0) S-181 (2.0) | KBM-403 (4.0) S-181 (2.0) | KBM-403 (4.0) S-181 (2.0) |
| Curing catalyst (part) | PX-4BT (0.2) | PX-4BT (0.2) | PX-4BT (0.2) | PX-4BT (0.2) | PX-4BT (0.2) | PX-4BT (0.2) |
| Linear expansion coefficient ($\times 10^{-5}$ deg$^{-1}$) | 2.4 | 2.4 | 2.4 | 2.5 | 2.5 | 2.5 |
| Heat conductivity (W · m$^{-1}$ · K$^{-1}$) | 1.35 | 1.35 | 1.35 | 0.53 | 0.68 | 1.25 |
| Cracking resistance (C-shaped washer method) | −20° C. | −20° C. | −20° C. | −10° C. | −10° C. | −10° C. |
| Insulation resistance after moisture absorption (after 180 days, Ω · cm) | $3.6 \times 10^{11}$ | $4.3 \times 10^{11}$ | $4.3 \times 10^{11}$ | $1.9 \times 10^{10}$ | $2.4 \times 10^{10}$ | $8.6 \times 10^{10}$ |
| Insulation resistance after moisture absorption (after 180 days, Ω · cm) | $5.4 \times 10^{11}$ | $5.2 \times 10^{11}$ | $5.2 \times 10^{11}$ | $2.3 \times 10^{10}$ | $3.5 \times 10^{10}$ | $9.2 \times 10^{10}$ |
| Flexural strength retention (after 180 days, %) | 70 | 79 | 78 | 40 | 39 | 49 |

TABLE 7

|  | Example 41 | Example 42 | Example 43 | Example 44 | Example 45 | Example 46 | Example 47 |
|---|---|---|---|---|---|---|---|
| Multifunctional epoxy resin (part) | PY-302-2 (100) | PY-302-2 (100) | PY-302-2 (100) | PY-302-2 (100) | PY-302-2 (100) | PY-302-2 (100) | PY-302-2 (100) |
| Acid anhydride curing agent (part) | HN-5500 (95) | HN-5500 (95) | HN-5500 (95) | HN-5500 (95) | HN-5500 (95) | HN-5500 (95) | HN-5500 (95) |

TABLE 7-continued

|  | Example 41 | Example 42 | Example 43 | Example 44 | Example 45 | Example 46 | Example 47 |
|---|---|---|---|---|---|---|---|
| Filler (part) | C-BASE-1 (670) SO-25R (30) | C-BASE-1 (650) SO-25R (20) | C-BASE-1 (650) SO-25R (20) | C-BASE-1 (640) SO-25R (20) | C-BASE-1 (640) SO-25R (20) | C-BASE-1 (640) SO-25R (20) | C-BASE-1 (640) SO-25R (20) |
| Surface active agent (part) | KBM-403 (4.0) S-181 (2.0) | KBM-403 (4.0) S-181 (2.0) | KBM-403 (3.0) S-181 (3.0) | KBM-403 (5.0) S-181 (1.0) | KBM-303 (4.0) S-181 (2.0) | KBM-803 (4.0) S-181 (2.0) | KBM-903 (4.0) S-181 (2.0) |
| Curing catalyst (part) | 2E4MZ-CN (0.2) | 2E4MZ-CN (0.2) | 2E4MZ-CN (0.2) | 2E4MZ-CN (0.2) | 2E4MZ-CN (0.2) | 2E4MZ-CN (0.2) | 2E4MZ-CN (0.2) |
| Linear expansion coefficient ($\times 10^{-5} \deg^{-1}$) | 2.3 | 2.3 | 2.4 | 2.4 | 2.4 | 2.4 | 2.3 |
| Heat conductivity ($W \cdot m^{-1} \cdot K^{-1}$) | 1.41 | 1.36 | 1.35 | 1.35 | 1.35 | 1.35 | 1.36 |
| Cracking resistance (C-shaped washer method) | $-40°$ C. | $-40°$ C. | $-50°$ C. | $-40°$ C. | $-40°$ C. | $-40°$ C. | $-50°$ C. |
| Insulation resistance after moisture absorption (after 180 days, $\Omega \cdot cm$) | $1.2 \times 10^{12}$ | $2.4 \times 10^{12}$ | $6.5 \times 10^{11}$ | $8.2 \times 10^{11}$ | $9.8 \times 10^{11}$ | $9.5 \times 10^{11}$ | $2.5 \times 10^{12}$ |
| Insulation resistance after moisture absorption (after 180 days, $\Omega \cdot cm$) | $2.5 \times 10^{12}$ | $3.3 \times 10^{12}$ | $7.2 \times 10^{11}$ | $9.9 \times 10^{11}$ | $1.5 \times 10^{12}$ | $1.2 \times 10^{12}$ | $3.5 \times 10^{12}$ |
| Flexural strength retention (after 180 days, %) | 92 | 95 | 83 | 89 | 89 | 88 | 95 |

TABLE 8

|  | Example 48 | Example 49 | Example 50 | Example 51 | Example 52 | Example 53 | Example 54 |
|---|---|---|---|---|---|---|---|
| Multifunctional epoxy resin (part) | A (100) | A (100) | A (100) | A (100) | A (100) | A (100) | A (100) |
| Acid anhydride curing agent (part) | HN-5500 (95) | HN-5500 (95) | HN-5500 (95) | HN-5500 (95) | HN-5500 (95) | HN-5500 (95) | HN-5500 (95) |
| Filler (part) | C-BASE-1 (640) SO-25R (20) | C-BASE-1 (640) SO-25R (20) | C-BASE-6 (900) SO-25R (40) | C-BASE-1 (100) C-BASE-2 (300) C-BASE-8 (300) SO-25R (40) | C-BASE-1 (300) C-BASE-5 (300) C-BASE-8 (300) SO-25R (50) | C-BASE-1 (300) C-BASE-5 (300) C-BASE-8 (300) SO-25R (40) | C-BASE-1 (187) C-BASE-4 (187) C-BASE-8 (187) SO-25R (30) |
| Surface active agent (part) | KBM-403 (4.0) S-181 (2.0) | KBM-403 (4.0) KR-25 (2.0) | KBM-403 (4.0) S-181 (3.0) | KBM-403 (4.0) S-181 (3.0) | KBM-903 (4.0) S-181 (3.0) | KBM-403 (4.0) S-181 (3.0) | KBM-403 (4.0) S-181 (2.0) |
| Curing catalyst (part) | 2E4MZ-CN (0.2) | 2E4MZ-CN (0.2) | 2E4MZ-CN (0.2) | 2E4MZ-CN (0.2) | 2E4MZ-CN (0.2) | 2E4MZ-CN (0.2) | MC-C11Z-AZINE (2.0) |
| Linear expansion coefficient ($\times 10^{-5} \deg^{-1}$) | 2.3 | 2.1 | 2.1 | 2.1 | 2.1 | 2.1 | 2.1 |
| Heat conductivity ($W \cdot m^{-1} \cdot K^{-1}$) | 1.36 | 1.35 | 1.84 | 1.84 | 1.85 | 1.87 | 1.12 |
| Cracking resistance (C-shaped washer method) | $-50°$ C. | $-40°$ C. | $-40°$ C. | $-50°$ C. | $-50°$ C. | $-50°$ C. | $-40°$ C. |
| Insulation resistance after moisture absorption (after 180 days, $\Omega \cdot cm$) | $2.9 \times 10^{12}$ | $5.8 \times 10^{11}$ | $5.8 \times 10^{11}$ | $8.6 \times 10^{11}$ | $8.3 \times 10^{11}$ | $1.1 \times 10^{12}$ | $3.2 \times 10^{12}$ |
| Insulation resistance after moisture absorption (after 180 days, $\Omega \cdot cm$) | $3.2 \times 10^{12}$ | $6.5 \times 10^{11}$ | $6.2 \times 10^{11}$ | $9.8 \times 10^{11}$ | $9.8 \times 10^{11}$ | $2.2 \times 10^{12}$ | $5.2 \times 10^{12}$ |
| Flexural strength retention (after 180 days, %) | 94 | 77 | 76 | 85 | 88 | 92 | 97 |

EXAMPLES 55 TO 61

Figure 8A:
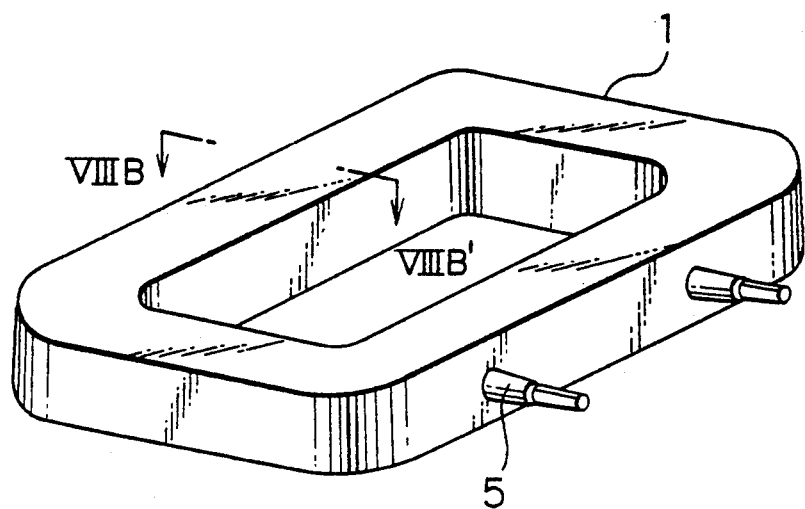
FIG. 8A is a perspective view showing a linear motor car ground coil and FIG. 8B is an enlarged sectional view taken along the line VIII—VIII' of FIG. 8A.
Figure 8B:
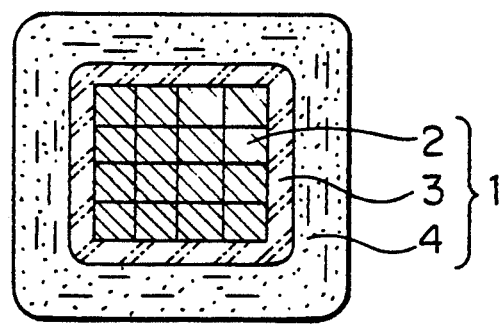

As shown in FIG. 8, a glass backing impregpregnated mica tape was wound round an Al conductor and cured under heat and pressure; to the resulting Al conductor was cast each of the thermosetting resin compositions for casting high-voltage coils obtained in Examples 41, 42, 43, 48, 49, 52 and 54, and cured by heating at 130° C. for 2 hours and further at 150° C. for 5 hours, whereby a driving coil for linear motor cars was obtained. The thermosetting resin composition for casting high-voltage coils of the present invention is excellent in workability since it is of low viscosity before curing; further since it has high thermal resistance and excellent cracking resistance the linear motor car ground driving guide coil prepared above contained no voids and was excellent in electrical and mechanical properties.

EXAMPLES 62 TO 64

Figure 9A:
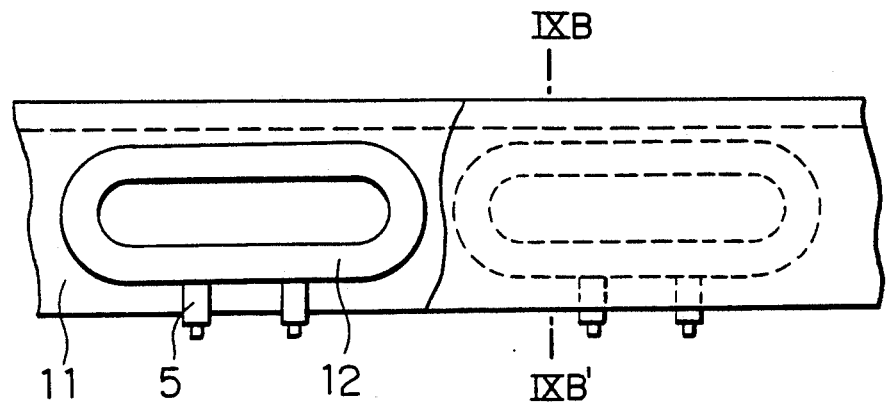
FIG. 9A is a front view showing a linear motor car ground coil panel.
Figure 9B:
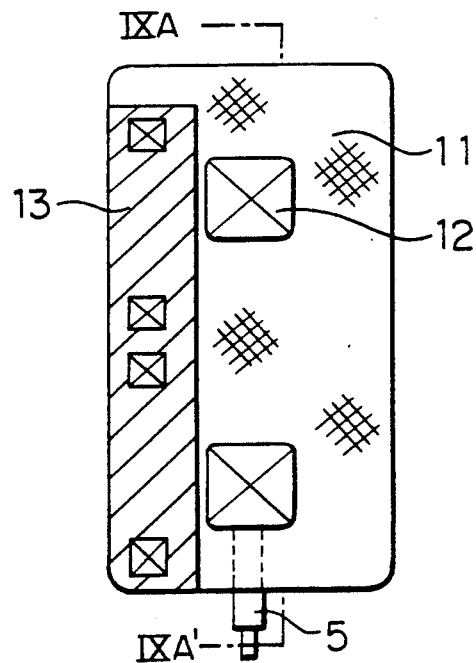
FIG. 9B is a sectional view taken along IXB—IXB' of FIG. 9A.

The coils of Examples 55 to 57 obtained by casting with the thermosetting resin compositions for casting high-voltage coils of Examples 41, 42 and 43, followed by heat curing, were embedded into concrete or resin concrete whereby concrete panels as shown in FIG. 9 were obtained.

EXAMPLES 65 TO 71

Figure 10A:
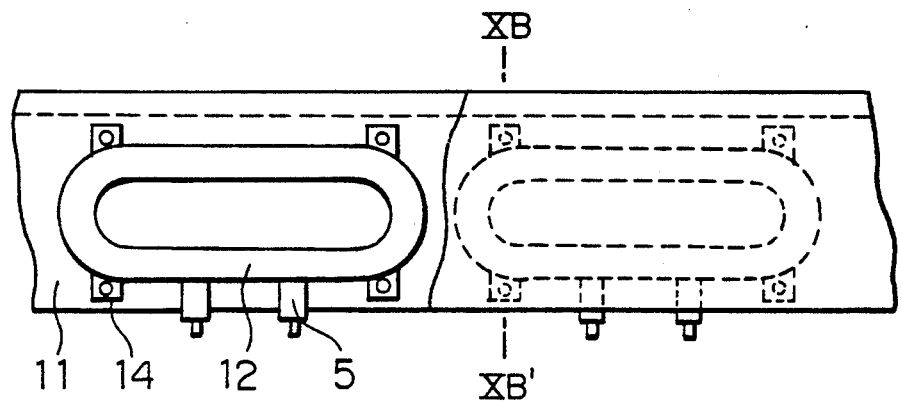
FIG. 10A is a front view showing a linear motor car ground coil panel.
Figure 10B:
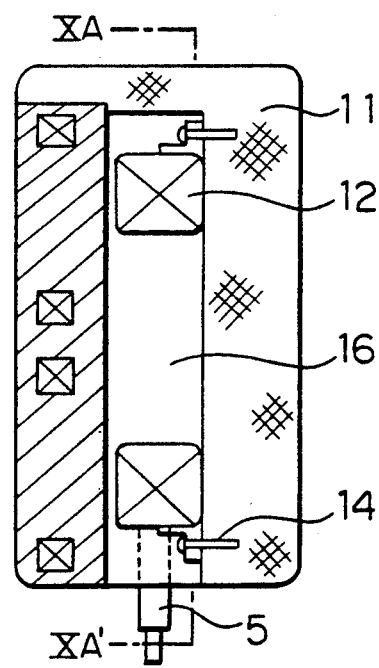
FIG. 10B is a sectional view taken along XB—XB' of FIG. 10A.

The coils of Examples 55 to 61 obtained by casting with the thermosetting resin compositions for casting high-voltage coils of Examples 41, 42, 43, 48, 49, 52 and 54, followed by heat curing, were directly attached to hardened concrete or hardened resin concrete with bolts, whereby the concrete panels as shown in FIG. 10 were obtained.

EXAMPLES 72 TO 78

Figure 11A:
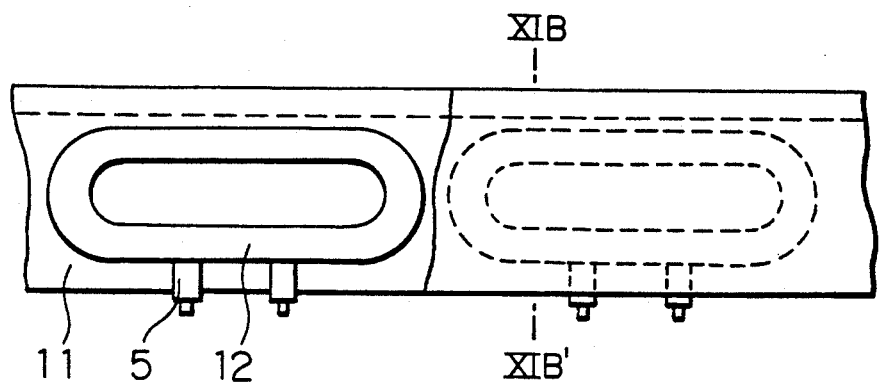
FIG. 11A is a front view showing a linear motor car ground coil panel.
Figure 11B:
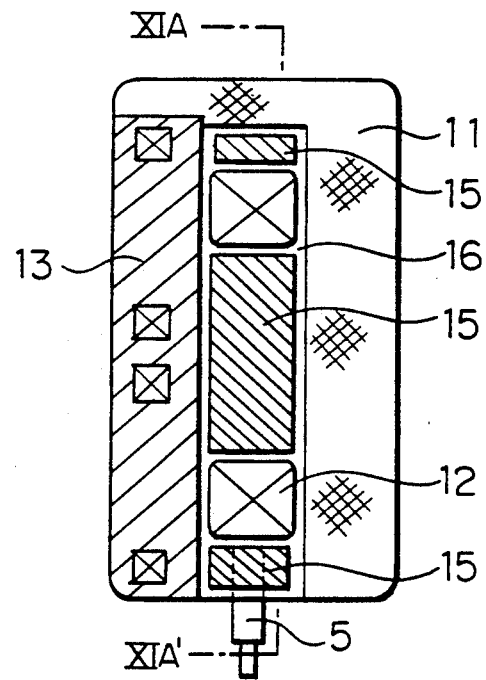
FIG. 11B is a sectional view taken along XIB—XIB' of FIG. 11A.

The coils of Examples 55 to 61 obtained by casting with the thermosetting resin compositions for casting high-voltage coils of Examples 41, 42, 43, 48, 49, 52 and 54, followed by heat-curing, were directly attached to hardened concrete or hardened resin concrete with spacers, whereby concrete panels as shown in FIG. 11 were obtained.

EXAMPLES 79 TO 85

Figure 12A:
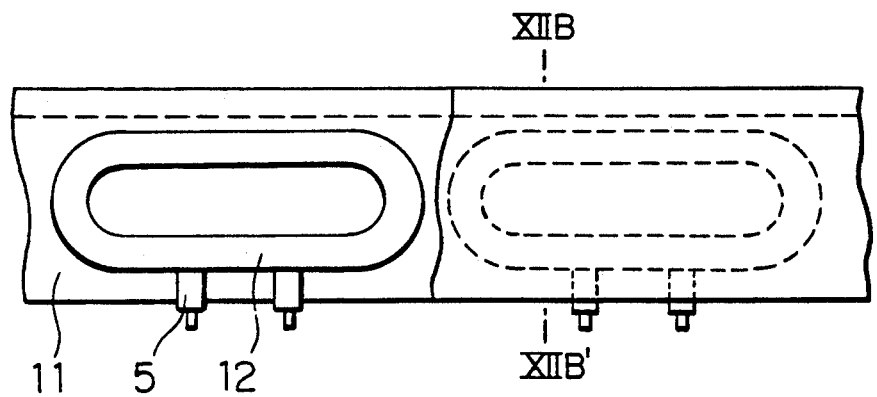
FIG. 12A is a front view showing a linear motor car ground coil panel.
Figure 12B:
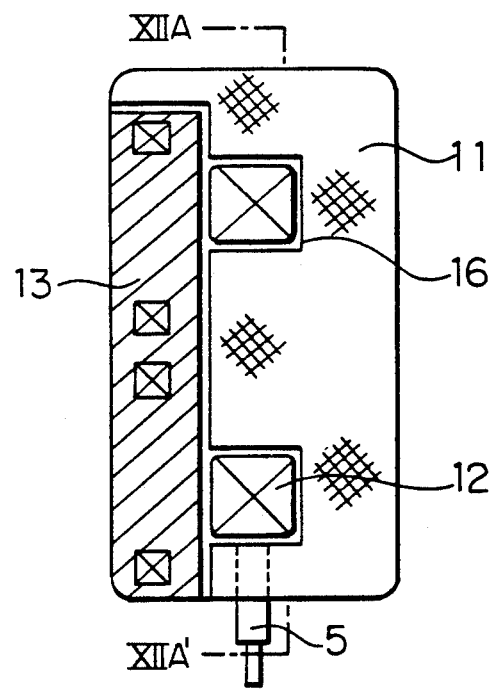
FIG. 12B is a sectional view taken along XIIB—XIIB' of FIG. 12A.

The coils of Examples 55 to 61 obtained by casting with the thermosetting resin compositions for casting high-voltage coils of Examples 41, 42, 43, 48, 49, 52 and 54, followed by heat-curing, were fixed directly to hardened concrete or resin concrete provided with a groove capable of accommodating the coil, whereby concrete panels as shown in FIG. 12 were obtained.

EXAMPLES 86 TO 92

Figure 13A:
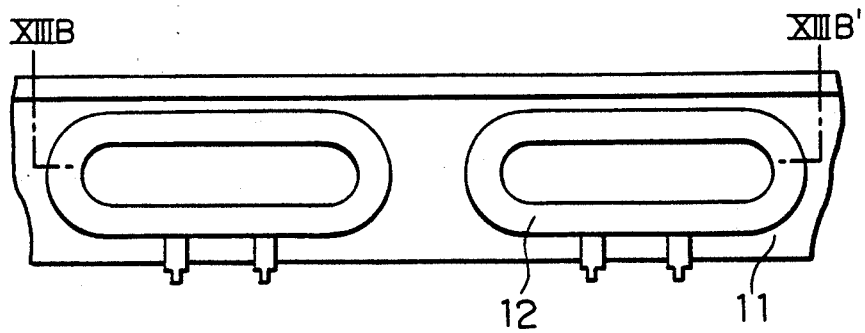
FIG. 13A is a front view showing a linear motor car ground coil panel.
Figure 13B:
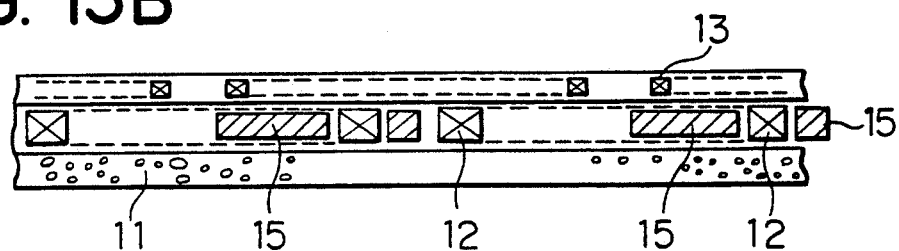
FIG. 13B is a sectional view taken along XIIIB—XIIIB' of FIG. 13A.

The coils of Examples 55 to 61 obtained by casting with the thermosetting resin compositions for casting high-voltage coils of Examples 41, 42, 43, 48, 49, 52 and 54, followed by heat-curing, were attached to hardened concrete or hardened resin concrete in such a way that one side of the coil was fixed directly to the concrete so that it might not move even when subjected to electromagnetic vibration or thrust and the other side was rendered free to reduce thermal stress, whereby concrete panels as shown in FIG. 13 were prepared.

EXAMPLES 93 TO 99

Figure 14A:
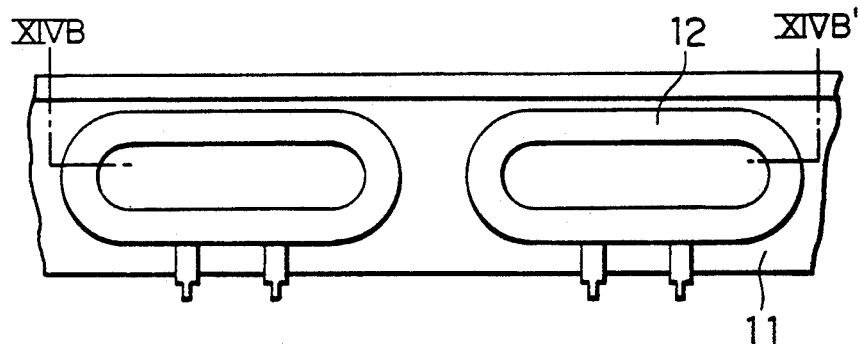
FIG. 14A is a front view showing a linear motor car ground coil panel.
Figure 14B:
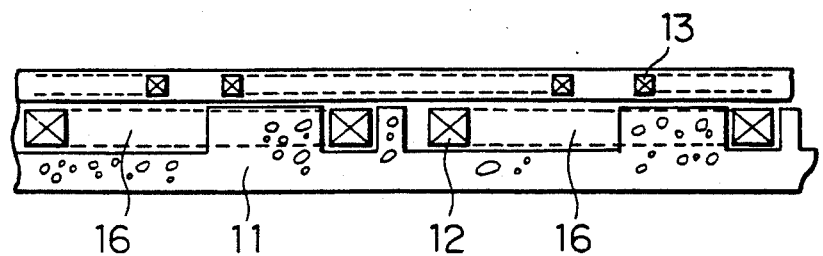
FIG. 14B is a sectional view taken along XIVB—XIVB' of FIG. 14A.

The coils of Examples 55 to 61 obtained by casting with the thermosetting resin compositions for casting high-voltage coils of Examples 41, 42, 43, 48, 49, 52 and 54, followed by heat-curing, were attached to hardened concrete or hardened resin concrete provided with a groove in such a way that one side of the coil was fixed directly to the concrete so that it might not move even when subjected to electromagnetic vibration or thrust and the other side was rendered free with the aid of the groove to reduce thermal stress, whereby concrete pannels as shown in FIG. 14 were prepared.

EXAMPLES 100 TO 106

Figure 15A:
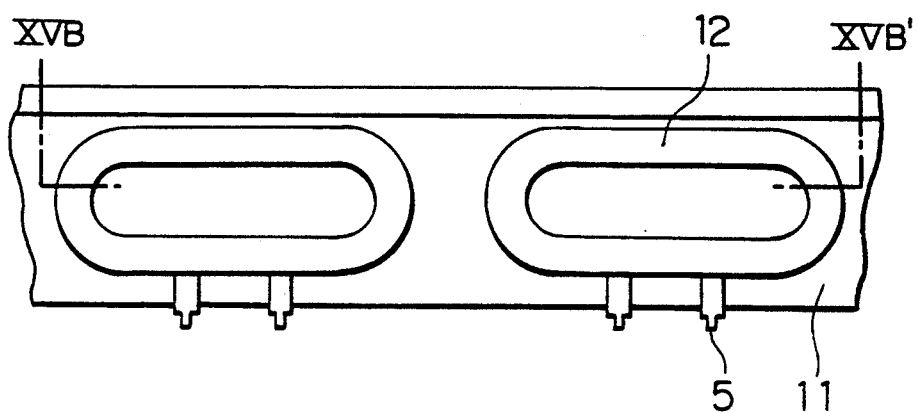
FIG. 15A is a front view showing a linear motor car ground coil panel.
Figure 15B:
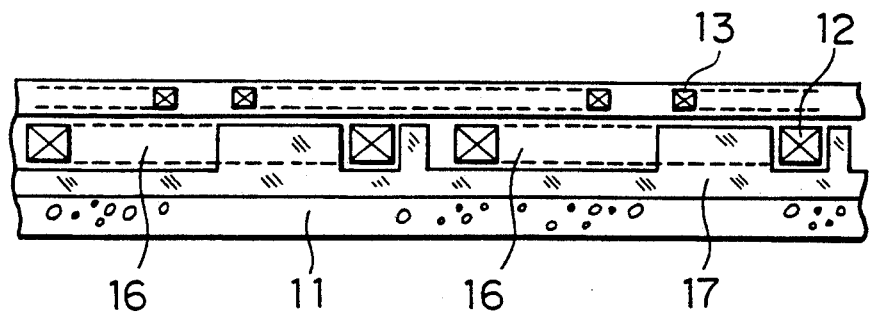
FIG. 15B is a sectional view taken along XVB—XVB' of FIG. 15A.
Figure 16A:
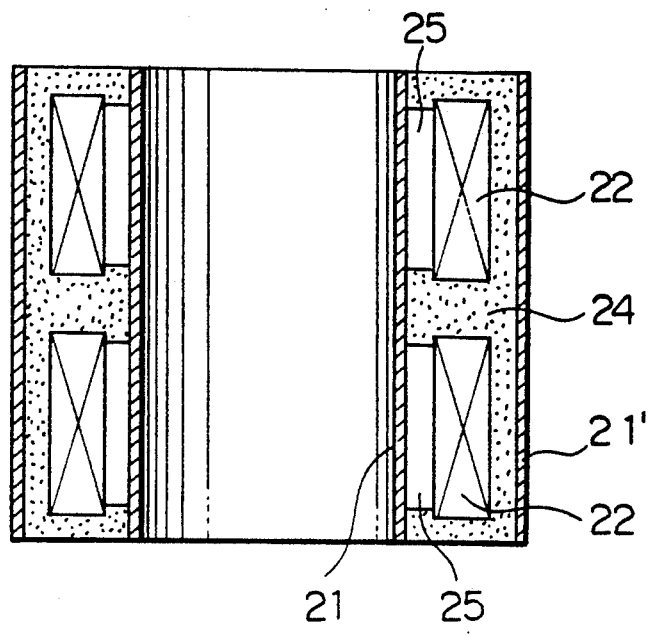
FIG. 16A is a vertical sectional view taken along XVIA—XVIA' of FIG. 16B.
Figure 16B:
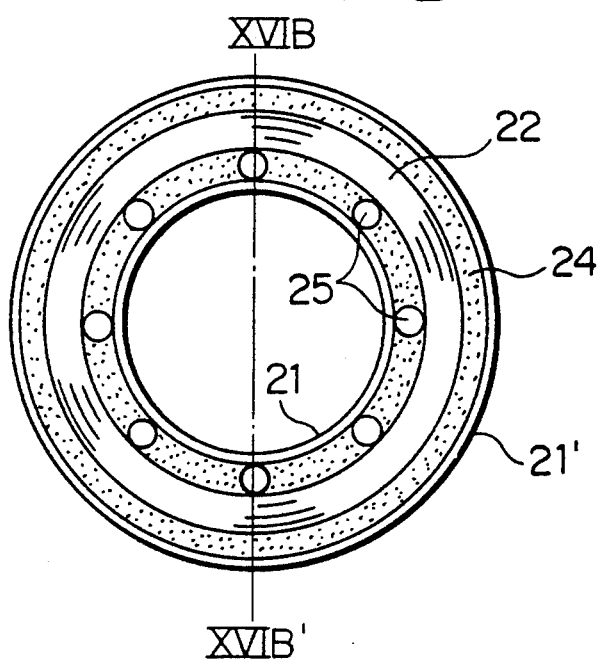
FIG. 16B is a transverse sectional view of a transformer coil.

The coils of Examples 55 to 61 obtained by casting with the thermosetting resin compositions for casting high-voltage coils of Examples 41, 42, 43, 48, 49, 52 and 54, followed by heat-curing, were attached to hardened concrete or hardened resin concrete in such a way that one side of the coil was fixed directly to the concrete with an integral FRP spacer so that it might not move even when subjected to electromagnetic vibration or thrust, and the other side was rendered free to reduce thermal stress, whereby concrete panels as shown in FIG. 15 were prepared.

EXAMPLE 98

On the assumption that when a concrete panel is placed in natural environment it is subjected to a temperature of down to $-30°$ C. in winter and up to $90°$ C. in summer, a heat cycle of from $-30°$ C. to $90°$ C. and back to $-30°$ C. was applied twice to concrete panels of Examples 62 to 106. As the result, minute cracks developed in concrete of all concrete panels except those of Examples 86 to 106.

What is claimed is:

1. A thermosetting resin composition for casting high-voltage coils comprising a thermosetting resin and a filler, wherein the amount of the filler is 60%-85% by weight, based on the total weight of the thermosetting resin composition, said filler comprising a silica type filler consisting essentially (A) a spherical silica having an average particle diameter of 0.1-0.9 $\mu$m and (B) a ground silica having an average particle diameter of 3-24 $\mu$m, provided that the maximum particle is 60 $\mu$m or less, the ratio A/(A+B) being 1%-7% by weight.

2. A thermosetting resin composition for casting high-voltage coils comprising a thermosetting resin and a filler, wherein the amount of the filler is 60%-85% by weight, based on the total weight of the thermosetting resin composition, said filler comprising a silica type filler consisting essentially of (A) a spherical silica having an average diameter of 0.1-0.9 $\mu$m and (B) a ground silica having an average particle diameter of 3-24 $\mu$m, the ratio A/(A+B) being 1.5%-5% by weight.

3. A thermosetting resin composition for casting high-voltage coils comprising a thermosetting resin and a filler, wherein the amount of the filler is 60%-85% by weight, based on the total weight of the thermosetting resin composition, said filler comprising a silica type filler consisting essentially of (A) a spherical silica having an average diameter of 0.1-0.9 $\mu$m and (B) a ground silica having an average particle diameter of 3-24 $\mu$m, provided that the maximum particle diameter is 60 $\mu$m or less, the ratio A/(A+B) being 2% to 4% by weight.

4. A thermosetting resin composition for casting high-voltage coils comprising a thermosetting resin, a filler and a surface active agent, wherein the amount of the filler is 60%-85% by weight, based on the total weight of the thermosetting resin composition, said filler comprising a silica type filler consisting essentially of (A) a spherical silica having an average diameter of 0.1-0.9 $\mu$m and (B) a ground silica having an average particle diameter of 3-9 $\mu$m, the ratio A/(A+B) being 1%-7% by weight.

5. A thermosetting resin composition for casting high-voltage coils comprising a thermosetting resin, a filler and a surface active agent, wherein the amount of the filler is 60%-85% by weight, based on the total weight of the thermosetting resin composition, said filler comprising a silica type filler consisting essentially of (A) a spherical silica having an average diameter of 0.1-0.9 $\mu$m and (B) a ground silica having an average particle diameter of 3-9 $\mu$m, provided that the maximum particle diameter is 60 $\mu$m or less, the ratio A/(A+B) being 1%-7% by weight, and the surface active agent contains both a titanate type surface active agent and a silane type surface active agent.

6. A thermosetting resin composition for casting high-voltage coils comprising a thermosetting resin, a filler and a surface active agent, wherein the amount of the filler is 60%-85% by weight, based on the total weight of the thermosetting resin composition, said filler comprising a silica type filler consisting essentially of (A) a spherical silica having an average diameter of 0.1–0.9 µm and (B) a ground silica having an average particle diameter of 3–24 µm, provided that the maximum particle diameter is 60 µm or less, the ratio A/(A+B) being 1%–7% by weight, and the surface active agent contains both a nonfunctional surface active agent and a multifunctional surface active agent.

7. A thermosetting resin composition for casting high-voltage coils comprising a thermosetting resin, a filler and a surface active agent, wherein the amount of the filler is 60%–85% by weight, based on the total weight of the thermosetting resin composition, said filler comprising a silica type filler consisting essentially of (A) a spherical silica having an average diameter of 0.1–0.9 µm and (B) a ground silica having an average particle diameter of 3–9 µm, the ratio A/(A+B) being 1%–7% by weight, and the surface active agent contains both a monofunctional surface active agent and a multifunctional surface active agent.

8. A thermosetting resin composition for casting high-voltage coils comprising a thermosetting resin and a filler, in which the amount of the filler is 60%–85% by weight, based on the total weight of the thermosetting resin composition, said filler comprising a silica type filler consisting essentially of (A) a spherical silica having an average diameter of 0.1–0.9 µm and (B) a ground silica having an average particle diameter of 3–9 µm, the ratio A/(A+B) being 1%–7% by weight, and which is a liquid having a viscosity of 50 poises or less at 100° C. or below.

9. A thermosetting resin composition for casting high-voltage coils comprising a thermosetting resin, a filler and a surface active agent, wherein the amount of the filler is 60%–85% by weight, based on the total weight of the thermosetting resin composition, said filler comprising a silica type filler consisting essentially of (A) a spherical silica having an average diameter of 0.1–0.9 µm and (B) a ground silica having an average particle diameter of 3–9 µm, the ratio A/(A+B) being 1%–7% by weight, the surface active agent contains both a titanate type surface active agent and a silane type surface active agent, and wherein the composition is a liquid having a viscosity of 50 poises or less at 100° C. or below.

10. A thermosetting resin composition for casting high-voltage coils comprising a multifunctional epoxy resin, an acid anhydride curing agent, a filler, a surface active agent and a curing catalyst, wherein the amount of the filler is 60%–85% by weight, based on the total weight of the thermosetting resin composition, said filler comprising a silica type filler consisting essentially of (A) a spherical silica having an average diameter of 0.1–0.9 µm and (B) a ground silica having an average particle diameter of 3–9 µm, the ratio A/(A+B) being 1%–7% by weight.

11. A thermosetting resin composition for casting high-voltage coils according to claim 10, wherein an average particle the ratio A/(A+B) being 1.5%–5% by weight, and the surface active agent contains both a titanate type surface active agent and a silane type surface active agent.

12. A thermosetting resin composition for casting high-voltage coils according to claim 10, wherein the multifunctional epoxy resin is (a) bisphenol AF type and/or bisphenol F type multifunctional epoxy resin(s).

13. A thermosetting resin composition for casting high-voltage coils according to claim 10, wherein the half value period of the flexural strength of the cured product of the thermosetting resin composition is at least 180 days in an atmosphere of 98% humidity at 60° C.

14. A thermosetting resin composition for casting high-voltage coils according to claim 10, wherein the half value period of the flexural strength of the cured product of the thermosetting resin composition is at least 15 years in an atmosphere of 98% humidity at room temperature.

15. A thermosetting resin composition for casting high-voltage coils according to claim 10 wherein the insulation resistance of the cured product of the thermosetting resin composition is at least $1 \times 10^{11}$ Ω·cm when the product has been held in an atmosphere of 98% humidity at 60° C. for at least 180 days.

16. A thermosetting resin composition for casting high-voltage coils according to claim 10, wherein the insulation resistance of the cured product of the thermosetting resin composition is at least $1 \times 10^{11}$ Ω·cm when the product has been held in an atmosphere of 98% humidity at room temperature for at least 15 years.

17. A thermosetting resin composition for casting high-voltage coils according to claim 10 wherein the cured product of the thermosetting resin composition has thermal expansion coefficient of $(2.3 \pm 0.2) \times 10^{-5}$ deg$^{-1}$ and a heat conductivity of $(0.8-2)$ W·m$^{-1}$·K$^{-1}$.

18. A thermosetting resin composition for casting high-voltage coils according to any one of claim 1 to 9, and 11 to 16, wherein the cured product of the thermosetting resin composition has a thermal expansion coefficient of $(2.3 \pm 0.2) \times 10^{-5}$ deg$^{-1}$ and a heat conductivity of $(0.8-2)$ W·m$^{-1}$·K$^{-1}$.

19. A thermosetting resin composition for casting high-voltage coils wherein the cured product of the thermosetting resin composition has a flexural strength of at least ½ of the initial value when held in an atmosphere of 98% humidity at 60° C. for 180 days and subjected to a heat cycle of from −30° C. to 90° C.

20. A thermosetting resin composition for use in adhesion comprising a thermosetting resin and a filler, wherein the amount of the filler is 60%–85% by weight, based on the total weight of the thermosetting resin composition, said filler comprising a silica type filler consisting of (A) a spherical silica having an average particle diameter of 0.1–0.9 µm and (B) a ground silica having an average particle diameter of 3–24 µm, provided that the maximum particle diameter is 60 µm or less, the ratio A/(A+B) being 1%–7% by weight.

21. A thermosetting resin composition for casting high-voltage coils comprising a thermosetting resin and a filler, which comprises admixing a filler in an amount of 60%–85% by weight, based on the total weight of the thermosetting resin composition, with the resin, said filler comprising a silica type filler obtained by mixing (A) a spherical silica of a single particle distribution having an average particle diameter of 0.1–0.9 µm and (B) a ground silica having an average particle diameter of 3–24 µm, provided that the maximum diameter is 60 µm or less, obtained by mixing two or more kinds of crystalline silica different in particle distribution, so as to give a ratio A/(A+B) of 1%–7% by weight.

22. A process for producing a thermosetting resin composition for casting high-voltage coils comprising at least a multifunctional epoxy resin, an acid anhydride curing agent, a filler, a surface active agent, and a curing agent, wherein said filler is 60%–85% by weight of the total weight of the thermosetting resin composition, said filler comprising a silica type filler consisting essentially of a spherical silica having an average particle diameter of 0.1–0.9 μm and (B) a ground silica having an average particle diameter adjusted to 3–24 μm, provided that the maximum particle diameter is 60 μm or less, the ratio A/(A+B) being 1%–7% by weight, and wherein two liquid compositions consisting of (I) a composition obtained by mixing multifunctional epoxy resin, a surface agent and the filler beforehand and (II) a composition obtained by mixing an acid anhydride curing agent, a surface active agent, the filler, and a curing agent beforehand are prepared and then the compositions (I) and (II) are mixed together.

23. A process for producing a thermosetting resin composition for casting high-voltage coils according to claim 22, wherein the surface active agent of the composition (I) is a silane type surface active agent and the surface active agent of the composition (II) is a titanate type surface active agent.

24. A filler for a thermosetting resin composition for casting high-voltage coils, said filler consisting essentially of (A) a spherical silica having an average particle diameter of 0.1–0.9 μm and (B) a ground silica having an average particle diameter of 3–24 μm, provided that the maximum diameter is 60 μm or less, the ratio A/(A+B) being 1%–7% by weight.

25. A filler essentially of (A) a spherical silica having an average particle diameter of 0.1–0.9 μm and (B) a coarse particle silica having an average particle diameter of 3–24 μm, provided that the maximum particle diameter is 60 μm or less, the ratio A/(A+B) being 1%–7% by weight said filler having been treated with a surface active agent.

26. A filler according to claim 25, wherein the surface active agent contains both a monofunctional surface active agent and a multifunctional surface active agent.

27. A cured product of a thermosetting resin composition for casting high-voltage coils comprising a cured thermosetting resin and a filler, wherein the amount of the filler is 60%–85% by weight, based on the total weight of the composition, said filler comprising a silica type filler consisting essentially of (A) a spherical silica having an average particle diameter of 0.1–0.9 μm and (B) a ground silica having an average particle diameter of 3–24 μm, provided that the maximum diameter is 60 μm or less, the ratio A/(A+B) being 1%–7% by weight.

28. A cured product according to claim 27, obtained by heat-curing the thermosetting resin composition at least a multifunctional epoxy resin as the thermosetting resin, an acid anhydride curing agent, the filler, a surface active agent, and a curing catalyst.

29. A cured product obtained by heat-curing thermosetting resin composition for casting high-voltage coils according to claim 27 or 28, wherein the thermosetting resin composition for casting high-voltage coils contains both a titanate type surface active agent and a silane type surface active agent.

30. A molded high-voltage coil formed by winding conductor and casting and curing a thermosetting resin composition for casting according to claim 1, wherein the half value period of the flexural strength of the cured product of the resin composition is at least 180 days in an atmosphere of 98% humidity at 60° C.

31. A molded high-voltage coil formed by winding a conductor and casting and curing the thermosetting resin composition for casting according to claim 1, wherein the half value period of the flexural strength of the cured product of the resin composition is at least 15 years in an atmosphere of 98% humidity at a room temperature.

32. A molded high-voltage coil formed by winding a conductor and casting and curing the thermosetting resin composition for casting according to claim 1, wherein the cured product of the resin composition has an insulation resistance of at least $1 \times 10^{11}$ Ω·cm when held in an atmosphere of 98% humidity at 60° C. for 180 days.

33. A molded high-voltage coil formed by winding a conductor and casting and curing the thermosetting resin composition for casting according to claim 1, wherein the cured product of the resin composition has an insulation resistance of at least $1 \times 10^{11}$ Ω·cm when placed in an atmosphere of 98% humidity at room temperature for 15 years.

34. A molded high-voltage coil formed by winding a conductor and casting and curing the thermosetting resin composition for casting according to claim 1, wherein the cured product of the resin composition has an insulation resistance of at least $1 \times 10^{11}$ Ω·cm after contacting with concrete in an atmosphere of 98% humidity at 60° C. for 180 days.

35. A molded high-voltage coil formed by winding a conductor and casting and curing the thermosetting resin composition for casting according to claim 1, wherein the cured product of the resin composition has an insulation resistance of at least $1 \times 10^{11}$ Ω·cm after contacting in an atmosphere of 98% humidity at a room temperature for 15 years.

36. A molded high-voltage coil according to claim 32 formed by winding a conductor and casting and curing a thermosetting resin composition for casting, wherein the cured product of the resin composition has an insulation resistance of at least $1 \times 10^{11}$ Ω·cm when held in an atmosphere of 98% humidity at 60° C. for 180 days, and then subjected to a heat cycle of from −30° C. to 90° C.

37. A molded high-voltage coil formed by winding a conductor and casting and curing the thermosetting resin composition for casting according to claim 1, wherein the cured product of the resin composition has a flexural strength of at least ½ of the initial value after having been held in an atmosphere of 98% humidity at 60° C. for 180 days and subjected to a heat cycle of from −30° C. to 90° C.

38. A molded high-voltage coil formed by winding a conductor and casting and curing the thermosetting resin composition for casting according to claim 1, wherein the cured product of the resin composition has a thermal expansion coefficient of (the thermal expansion coefficient of the conductor $\pm 0.2) \times 10^{-5}$ deg$^{-1}$ and a heat conductivity of $(0.8-1.5)$ W·m$^{-1}$·K$^{-1}$.

39. A molded high-voltage coil formed by winding a conductor and casting and curing a thermosetting resin composition for casting, wherein the resin composition contains a thermosetting resin and 60%–85% by weight, based on the total weight of the composition, of a silica type filler consisting essentially of (A) a spherical silica having an average particle diameter of 0.1–0.9 μm and (B) a coarse particle silica having an average particle diameter of 3–24 μm, provided that the maximum diameter is 60 μm or less, the ratio A/(A+B) being 1%–7% by weight.

40. A process for producing a molded high-voltage coil which comprises winding a conductor and casting and curing a thermosetting resin composition for casting containing a multifunctional epoxy resin, a surface active agent, a curing agent, and a filler, wherein the amount of the filler in the composition is 60%-85% by weight, based on the total weight of the thermosetting resin composition for casting, said filler comprising a silica type filler obtained by mixing (A) a spherical silica having an average particle diameter of 0.1-0.9 μm and (B) a ground silica having an average particle diameter of 3-24 μm, provided that the maximum particle diameter is 60 μm or less, so as to give a ratio A/(A+B) being 1%-7% by weight, and two liquid compositions of (I) a resin composition obtained by mixing multifunctional epoxy resin, a surface agent and said filler beforehand and (II) a composition obtained by mixing an acid anhydride curing agent, a surface active agent, said filler, and a curing agent beforehand are prepared and then the compositions (I) and (II) are mixed to form the thermosetting resin composition for casting.

41. A panel formed by fixing a molded high-voltage coil obtained by winding a conductor and casting and curing a thermosetting resin composition for casting to concrete or resin concrete with a bolt, spacer or the like, wherein the resin composition contains a filler in an amount of 60%-85% by weight, based on the total weight of the thermosetting resin composition, said filler comprising a silica type filler consisting essentially of (A) a spherical silica having an average particle diameter of 0.1-0.9 μm and (B) a ground silica having an average particle diameter of 3-24 μm, provided that the maximum diameter is 60 μm or less, the ratio A/(A+B) being 1%-7% by weight.

42. A panel formed by fixing a molded high-voltage coil obtained by winding a conductor and casting and curing a thermosetting resin composition for casting to concrete or resin concrete with a bolt, spacer, or the like, wherein the resin composition contains a thermosetting resin and 60%-85% by weight, based on the total weight of the thermosetting resin composition, of a silica type filler consisting essentially of (A) a spherical silica having an average particle diameter of 0.1-0.9 μm and (B) a ground silica having an average particle diameter of 3-24 μm, provided that the maximum diameter is 60 μm or less, the ratio A/(A+B) being 1%-7% by weight, and wherein a part of the coil is rendered free of thermal elongation.

43. A transformer using a molded coil formed by winding a coil and casting and curing a thermosetting resin composition for casting high-voltage coils, wherein the resin composition contains thermosetting resin and 60%-85% by weight, on the total weight of the composition, of a silica type filler consisting essentially of (A) a spherical silica having an average particle diameter of 0.1-0.9 μm and (B) a coarse particle silica having an average particle diameter of 3-24 μm, provided that the maximum particle diameter is 60 μm or less, the ratio A/(A+B) being 1%-7% by weight.

* * * * *